(12) United States Patent
Kobori et al.

(10) Patent No.: US 8,394,538 B2
(45) Date of Patent: *Mar. 12, 2013

(54) ELECTRODE PLATE FOR NON-AQUEOUS ELECTROLYTE SECONDARY BATTERY, METHOD FOR PRODUCING THE SAME, AND NON-AQUEOUS ELECTROLYTE SECONDARY BATTERY

(75) Inventors: Hiroyuki Kobori, Tokyo-to (JP); Shingo Komura, Tokyo-to (JP); Hidenobu Watanabe, Kashiwa (JP); Ryo Fujiwara, Yokohama (JP); Keisuke Nomura, Matsudo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/265,266

(22) PCT Filed: Apr. 19, 2010

(86) PCT No.: PCT/JP2010/056939
§ 371 (c)(1),
(2), (4) Date: Oct. 19, 2011

(87) PCT Pub. No.: WO2010/122983
PCT Pub. Date: Oct. 28, 2010

(65) Prior Publication Data
US 2012/0040250 A1  Feb. 16, 2012

(30) Foreign Application Priority Data

Apr. 24, 2009 (JP) ................................. 2009-107179
Feb. 5, 2010 (JP) ................................. 2010-024837

(51) Int. Cl.
*H01M 4/02* (2006.01)
*H01M 4/13* (2010.01)
*H01M 4/62* (2006.01)
*H01M 6/00* (2006.01)
*H01M 10/00* (2006.01)

(52) U.S. Cl. ......................... 429/232; 429/209; 429/122

(58) Field of Classification Search .................. 429/232
See application file for complete search history.

(56) References Cited

U.S. PATENT DOCUMENTS 4,902,589 A  2/1990  Dahn et al.
(Continued)

FOREIGN PATENT DOCUMENTS

FR  2 890 785 A1  3/2007
JP  A-06-349482  12/1994
(Continued)

OTHER PUBLICATIONS

Office Action issued in Japanese Patent Application No. 2010-024837 dated Jul. 27, 2011 (with translation).
International Preliminary Report on Patentability issued in International Patent Application No. PCT/JP2010/056939 dated Jul. 20, 2010.

(Continued)

*Primary Examiner* — Barbara Gilliam
*Assistant Examiner* — Steven Scully
(74) *Attorney, Agent, or Firm* — Oliff & Berridge, PLC

(57) ABSTRACT

An electrode plate for a non-aqueous electrolyte secondary battery includes a current collector, and an electrode active material layer formed on at least part of the surface of the current collector. The electrode active material layer contains a particulate electrode active material, a binding material, and carbonic matter distinct from conductive materials. The binding material is a amorphous metal oxide that does not cause alkaline metal ion intercalation and deintercalation reactions.

6 Claims, 5 Drawing Sheets

U.S. PATENT DOCUMENTS

| | | | |
|---|---|---|---|
| 5,856,045 | A | 1/1999 | Fauteux et al. |
| 2002/0009645 | A1 | 1/2002 | Shima et al. |
| 2002/0039684 | A1 | 4/2002 | Matsubara et al. |
| 2002/0055046 | A1 | 5/2002 | Ono et al. |
| 2003/0082453 | A1 | 5/2003 | Numata et al. |
| 2004/0131940 | A1 | 7/2004 | Suzuki et al. |
| 2005/0098242 | A1 | 5/2005 | Hossick-Schott et al. |
| 2005/0130042 | A1* | 6/2005 | Liu et al. .................. 429/231.3 |
| 2006/0003226 | A1 | 1/2006 | Sawa et al. |
| 2006/0154071 | A1 | 7/2006 | Homma et al. |
| 2006/0216604 | A1 | 9/2006 | Kawase et al. |
| 2007/0154807 | A1 | 7/2007 | Kalynushkin et al. |
| 2008/0032197 | A1 | 2/2008 | Horpel et al. |
| 2008/0131781 | A1 | 6/2008 | Yong et al. |
| 2010/0000079 | A1 | 1/2010 | Hörpel et al. |
| 2010/0003401 | A1 | 1/2010 | Hörpel et al. |
| 2010/0203393 | A1 | 8/2010 | Depond |

FOREIGN PATENT DOCUMENTS

| | | |
|---|---|---|
| JP | A-9-503092 | 3/1997 |
| JP | A-10-208747 | 8/1998 |
| JP | A-11-144736 | 5/1999 |
| JP | A-2000-277119 | 10/2000 |
| JP | A-2001-155739 | 6/2001 |
| JP | A-2001-508916 | 7/2001 |
| JP | A-2002-141069 | 5/2002 |
| JP | A-2002-260656 | 9/2002 |
| JP | A-2003-142101 | 5/2003 |
| JP | A-2003-317707 | 11/2003 |
| JP | A-2004-087492 | 3/2004 |
| JP | A-2004-103304 | 4/2004 |
| JP | A-2005-078985 | 3/2005 |
| JP | A-2005-78985 | 3/2005 |
| JP | A-2005-78991 | 3/2005 |
| JP | A-2006-107750 | 4/2006 |
| JP | A-2006-310010 | 11/2006 |
| JP | A-2007-527603 | 9/2007 |
| JP | A-2008-517435 | 5/2008 |
| JP | A-2009-104818 | 5/2009 |
| JP | A-2009-181879 | 8/2009 |
| JP | A-2010-67436 | 3/2010 |
| JP | A-2010-129418 | 6/2010 |
| WO | WO 95/09449 A1 | 4/1995 |
| WO | WO 98/22986 A2 | 5/1998 |
| WO | WO 2006/045339 A2 | 5/2006 |

OTHER PUBLICATIONS

International Search Report issued in International Patent Application No. PCT/JP2010/056939 dated Jul. 20, 2010.
Jul. 27, 2010 International Search Report issued in International Application No. PCT/JP2010/056913 (with translation).
Dec. 1, 2011 International Preliminary Report on Patentability issued in International Application No. PCT/JP2010/056913.
May 31, 2012 Office Action issued in U.S. Appl. No. 12/659,738.
Dec. 1, 2010 Notification of Reasons for Rejection issued in corresponding Japanese Patent Application No. 2008-252684 (with translation).
U.S. Appl. No. 12/659,738, filed Mar. 19, 2010 in the name of Hiroyuki Kobori et al.
Dec. 1, 2010 Office Action issued in Japanese Patent Application No. 2008-252685 (with translation).
Mar. 22, 2012 Office Action issued in U.S. Appl. No. 12/659,892.
Nov. 10, 2011 Office Action issued in U.S. Appl. No. 12/659,892.
U.S. Appl. No. 12/659,892, filed Mar. 24, 2010 in the name of Hiroyuki Kobori.
Nov. 22, 2011 International Preliminary Report on Patentability issued in International application No. PCT/JP2010/056584 (with translation).
Jul. 6, 2010 International Search Report issued in International Application No. PCT/JP2010/056584 (with translation).
Jul. 20, 2010 International Search Report issued in International Application No. PCT/JP2010/056940 (with translation).
Nov. 22, 2011 International Preliminary Report on Patentability issued in International Application No. PCT/JP2010/056912.
Jul. 27, 2010 International Search Report issued in International Patent Application No. PCT/JP2010/056912 (with translation).
U.S. Appl. No. 13/234,581, filed Sep. 16, 2011 in the name of Hiroyuki Kobori et al.
Jun. 8, 2012 U.S. Office Action issued in U.S. Appl. No. 13/234,581.
U.S. Appl. No. 13/139,688, filed Jun. 14, 2011 in the name of Keisuke Nomura et al.
Jul. 13, 2012 U.S. Office Action issued in U.S. Appl. No. 13/139,688.
U.S. Appl. No. 13/265,220, filed Oct. 19, 2011 in the name of Hiroyuki Kobori et al.
Jun. 27, 2012 U.S. Office Action issued in U.S. Appl. No. 13/265,220.
U.S. Appl. No. 13/257,177, filed Sep. 16, 2011 in the name of Hiroyuki Kobori et al.
Jun. 21, 2012 U.S. Office Action issued in U.S. Appl. No. 13/257,177.
U.S. Office Action dated Nov. 26, 2012 in U.S. Appl. No. 12/659,738.

* cited by examiner

ELECTRODE PLATE FOR NON-AQUEOUS ELECTROLYTE SECONDARY BATTERY, METHOD FOR PRODUCING THE SAME, AND NON-AQUEOUS ELECTROLYTE SECONDARY BATTERY

TECHNICAL FIELD

The present invention relates to an electrode plate for use in a non-aqueous electrolyte secondary battery such as lithium-ion secondary battery, to a method for producing the same, and to a non-aqueous electrolyte secondary battery.

BACKGROUND ART

Non-aqueous electrolyte secondary batteries represented by lithium-ion secondary batteries have high energy density and high voltage, and do not cause the memory effect (a phenomenon in which a battery gradually loses its capacity when charged before it is completely discharged) on charge or discharge. Owing to these advantageous features, non-aqueous electrolyte secondary batteries are used in a variety of fields, such as the field of mobile devices, the field of laptop personal computers, and the field of portable devices.

In general, the above non-aqueous electrolyte secondary battery is composed of a cathode plate, an anode plate, a separator, and a non-aqueous electrolyte. For the cathode plate, an electrode plate having an electrode active material layer formed by a particulate cathode active material that is fixed to the surface of a current collector made of metal foil or the like is usually used. For the anode plate is usually used an electrode plate having an electrode active material layer formed by a particulate anode active material that is fixed to the surface of a current collector made from copper, aluminum, or the like.

A conventional method for producing an electrode plate that serves as the above cathode or anode plate is as follows. An electrode active material layer-forming composition in the form of a slurry is first prepared by kneading and/or dispersing, in a solvent, a particulate electrode active material that is a particulate cathode or anode active material, a resin binder, and a conductive material (provided that when electrode performance can be fully obtained without a conductive material, e.g., in the case where the particulate anode active material also has electrical conductivity, the conductive material may not be used), and, if necessary, other materials. The electrode active material layer-forming composition is applied to the surface of a current collector and then dried, and the coating film thus formed on the current collector is pressed, thereby obtaining an electrode plate having an electrode active material layer (e.g., JP 2006-310010A and JP2006-107750A).

The particulate electrode active material which is used in the electrode active material layer-forming composition is a particulate metallic compound dispersible in the composition. The particulate metallic compound itself cannot fix well to the surface of a current collector even if pressed after it has been applied to the current collector surface and then dried, and easily peels off the current collector. In order to overcome this drawback, a resin binder is added to the electrode active material layer-forming composition, and by means of the resin binder, the particulate electrode active material is fixed to a current collector to form an electrode active material layer. Thus, a resin binder has been considered to be a substantially essential ingredient of the electrode active material layer-forming composition.

In recent years, the development of lithium-ion secondary batteries for use in the fields of electric vehicles, hybrid vehicles, power tools, etc. that are needed to have high output and input characteristics has been advanced. Further, even secondary batteries for use in relatively-small-sized devices, such as mobile phones, are expected to have improved output and input characteristics, since such devices tend to be provided with a larger number of functions. In order to realize improvement of secondary batteries in output and input characteristics, it is necessary to decrease the impedance of the secondary batteries. This is because secondary batteries having high impedance suffer some problems; e.g., they cannot make the best use of their capacities on high-speed charging and discharging.

In order to decrease the impedance of a secondary battery, decreasing the impedance of the electrode plates of the secondary battery is effective, and increasing the electrode areas by making the electrode active material layers in the electrode plates thinner has been known as a means for decreasing the impedance of the battery. Further, since non-aqueous electrolytes for use in lithium-ion secondary batteries generally have higher resistivity than aqueous electrolytes, there has been discussed, from the beginning of development of lithium-ion secondary batteries, an embodiment using thinner electrode plates with larger electrode areas and a smaller electrode gap between the cathode and anode plates than those in other batteries such as lead accumulators.

However, when the presence of ingredients other than the particulate active material in the electrode active material layer is also taken into account, it is impossible to make the electrode active material layer thinner without limitation. Practically, the lower limit of the thickness of the electrode active material layer has been about several tens micrometers.

Another effective approach to improvement of electrode plates in high output and input characteristics is the use of a particulate active material with a smaller particle diameter. The use of a particulate active material with a smaller particle diameter can make the total surface area of the particulate electrode active material in the electrode active material layer larger, and moreover, it can make the distance of movement, in one particle of the electrode active material, of lithium ion that intercalates in and deintercalates from the particle of the electrode active material shorter. Consequently, the behavior of lithium ion becomes smoother, which leads to improvement in output and input characteristics.

Practically, however, the viscosity of the electrode active material layer-forming composition tends to increase as the particle diameter of the particles of the active material decreases. This tendency was significantly observed especially when a particulate active material with a particle diameter of 11 μm or less, or with a particle diameter much smaller than this, was used. For this reason, the practicable particle diameter of the particulate active material is substantially limited, which has been disadvantageous to the above attempt to make the electrode active material layer thinner.

DISCLOSURE OF INVENTION

In the light of the above circumstances, the present invention was accomplished. An object of the present invention is therefore to provide an electrode plate for use in a non-aqueous electrolyte secondary battery, having high output and input characteristics. Another object of the present invention is to provide a non-aqueous electrolyte secondary battery having high output and input characteristics with the use of the above electrode plate. A further object of the present invention is to provide a method for producing the above electrode plate.

The inventors found that it is possible to fix a particulate electrode active material to a current collector through an amorphous metal oxide that does not cause alkaline metal ion intercalation and deintercalation reactions, without using a resin binder that is used conventionally. The inventors also found that more desirable output and input characteristics can be obtained by making carbonic matter exist in an electrode active material layer. On the basis of these findings, the inventors accomplished the present invention, that is to say, an electrode plate for a non-aqueous electrolyte secondary battery and a non-aqueous electrolyte secondary battery using the electrode plate.

Besides, the inventors devised the following method as a means for producing an electrode plate including an electrode active material layer formed by a particulate electrode active material fixed to a current collector, without a resin binder, through an amorphous metal oxide that does not cause alkaline metal ion intercalation and deintercalation reactions: a composition containing at least a metallic-element-containing compound for forming a metal oxide that serves as a binding material, a particulate electrode active material, and an organic material, or a composition containing at least an organometallic compound for forming a metal oxide that serves as a binding material, and a particulate electrode active material, is prepared and is applied to a current collector so as to form a coating film, and the coating film thus formed on the current collector is heated at a proper temperature.

In other words, the inventors found that by heating the above coating film formed on the current collector at a temperature equal to or more than the temperature at which the metallic-element-containing compound or the organometallic compound begins to decompose thermally, and at the same time, less than the crystallization temperature of the metal oxide to be formed, it is possible to form the metal oxide that serves as a binding material, and also to fix the particles of the particulate electrode active material present around the binding material to the current collector. The inventors also found that by controlling the above heating temperature or the like, it is possible to make carbonic matter originating from the organic material or from the organometallic compound remain in the electrode active material layer as carbonic matter distinct from conductive materials. On the basis of these findings, the inventors accomplished the present invention, a method for producing an electrode plate for a non-aqueous electrolyte secondary battery.

An electrode plate for a non-aqueous electrolyte secondary battery according to the present invention comprises:
 a current collector, and
 an electrode active material layer formed on at least a part of the surface of the current collector,
 wherein the electrode active material layer includes a particulate electrode active material, a binding material, and carbonic matter distinct from conductive materials, and
 wherein the binding material is made of an amorphous metal oxide that does not cause alkaline metal ion intercalation and deintercalation reactions.

In the electrode plate for a non-aqueous electrolyte secondary battery according to the present invention, the electrode active material layer may further includes a conductive material.

Further, in the electrode plate for a non-aqueous electrolyte secondary battery according to the present invention, the metal oxide may be one containing a metallic element selected from a group consisting of Na, Mg, Al, Si, K, Ca, Sc, Ti, V, Cr, Mn, Fe, Co, Ni, Cu, Zn, Ga, Rb, Sr, Y, Zr, Nb, Mo, Tc, Ru, Rh, Pd, Ag, Cd, In and Sn, or a combined metal oxide containing two or more metallic elements selected from the above group.

Furthermore, in the electrode plate for a non-aqueous electrolyte secondary battery according to the present invention, the particulate electrode active material may have a particle diameter of 11 µm or less.

A non-aqueous electrolyte secondary battery according to the present invention comprises:
 a cathode plate,
 an anode plate,
 a separator placed between the cathode plate and the anode plate, and
 an electrolyte containing a non-aqueous solvent,
 wherein at least one of the cathode plate and the anode plate is the electrode plate for a non-aqueous electrolyte secondary battery set forth in claim 1.

A first method for producing an electrode plate for a non-aqueous electrolyte secondary battery according to the present invention comprises the steps of:
 applying an electrode active material layer-forming composition containing at least a particulate electrode active material, a metallic-element-containing compound for forming a metal oxide that serves as a binding material, and an organic material capable of giving carbonic matter distinct from conductive materials, to at least a part of a current collector, thereby forming a coating film, and
 heating the coating film so as to evaporate a solvent and to decompose the metallic-element-containing compound thermally into a metal oxide, thereby forming, on the current collector, an electrode active material layer containing the metal oxide and the particulate electrode active material,
 wherein a metallic-element-containing compound that forms, in the heating step, a metal oxide that does not cause alkaline metal ion intercalation and deintercalation reactions is selected as the metallic-element-containing compound, and
 wherein, in the heating step, the coating film is heated at a heating temperature, the heating temperature being equal to or more than the temperature at which the metallic-element-containing compound begins to decompose thermally, the heating temperature is less than the crystallization temperature of the metal oxide that is formed in the heating step, at the heating temperature carbon originating from the organic material being able to remain in the electrode active material layer as carbonic matter distinct from conductive materials.

In the first method for producing an electrode plate for a non-aqueous electrolyte secondary battery according to the present invention, the metallic-element-containing compound may be a metal salt.

A second method for producing an electrode plate for a non-aqueous electrolyte secondary battery according to the present invention comprises the steps of:
 applying an electrode active material layer-forming composition containing at least a particulate electrode active material and an organometallic compound for forming a metal oxide that serves as a binding material, to at least a part of a current collector, thereby forming a coating film, and
 heating the coating film so as to evaporate a solvent and to decompose the organometallic compound thermally into a metal oxide, thereby forming, on the current collector, an electrode active material layer containing the metal oxide and the particulate electrode active material,
 wherein an organometallic compound that forms, in the heating step, a metal oxide that does not cause alkaline metal ion intercalation and deintercalation reactions is selected as the organometallic compound, and wherein, in the heating step, the coating film is heated at a heating temperature, the heating temperature being equal to or more than the temperature at which the organometallic compound begins to decompose thermally, the heating temperature being less than the crystallization temperature of the metal oxide that is formed in the heating step, at the heating temperature carbon originating from the organometallic compound being able to remain in the electrode active material layer as carbonic matter distinct from conductive materials.

In the second method for producing an electrode plate for a non-aqueous electrolyte secondary battery according to the present invention, the organometallic compound may be a metal salt.

A third method for producing an electrode plate for a non-aqueous electrolyte secondary battery according to the present invention comprises the steps of:

applying an electrode active material layer-forming composition containing at least a particulate electrode active material, an organometallic compound for forming a metal oxide that serves as a binding material, and an organic material capable of giving carbonic matter distinct from conductive materials, to at least a part of a current collector, thereby forming a coating film, and heating the coating film so as to evaporate a solvent and to decompose the organometallic compound thermally into a metal oxide, thereby forming, on the current collector, an electrode active material layer containing the metal oxide and the particulate electrode active material, wherein an organometallic compound that forms, in the heating step, a metal oxide that does not cause alkaline metal ion intercalation and deintercalation reactions is selected as the organometallic compound, and wherein, in the heating step, the coating film is heated at a heating temperature, the heating temperature being equal to or more than the temperature at which the organometallic compound begins to decompose thermally, the heating temperature being less than the crystallization temperature of the metal oxide that is formed in the heating step, at the heating temperature being carbon originating from at least the organometallic compound or the organic material being able to remain in the electrode active material layer as carbonic matter distinct from conductive materials.

In the third method for producing an electrode plate for a non-aqueous electrolyte secondary battery according to the present invention, the organometallic compound may be a metal salt.

MODE FOR CARRYING OUT THE INVENTION

Embodiments for carrying out the electrode plate for a non-aqueous electrolyte secondary battery, the method for producing the electrode plate for a non-aqueous electrolyte secondary battery, and the non-aqueous electrolyte secondary battery according to the present invention will be hereinafter described in order. Taking lithium-ion secondary battery as an example, the non-aqueous electrolyte secondary battery of the present invention will be explained in the following description, unless otherwise specified. As for the feature of the metal oxide in the present invention "not causing alkaline metal ion intercalation and deintercalation reactions", lithium ion is taken as an example of the alkaline metal ion in the explanation of intercalation and deintercalation of an alkaline metal ion, unless otherwise specified. Further, the electrode plate of the present invention can serve as both the cathode plate and the anode plate in a non-aqueous electrolyte secondary battery. The explanation of the electrode plate given in the following description, therefore, applies to both the cathode plate and the anode plate, unless otherwise specified. Explanation of the cathode plate and that of the anode plate are given separately, only when necessary.

[Electrode Plate for Non-Aqueous Electrolyte Secondary Battery]

Figure 9A:
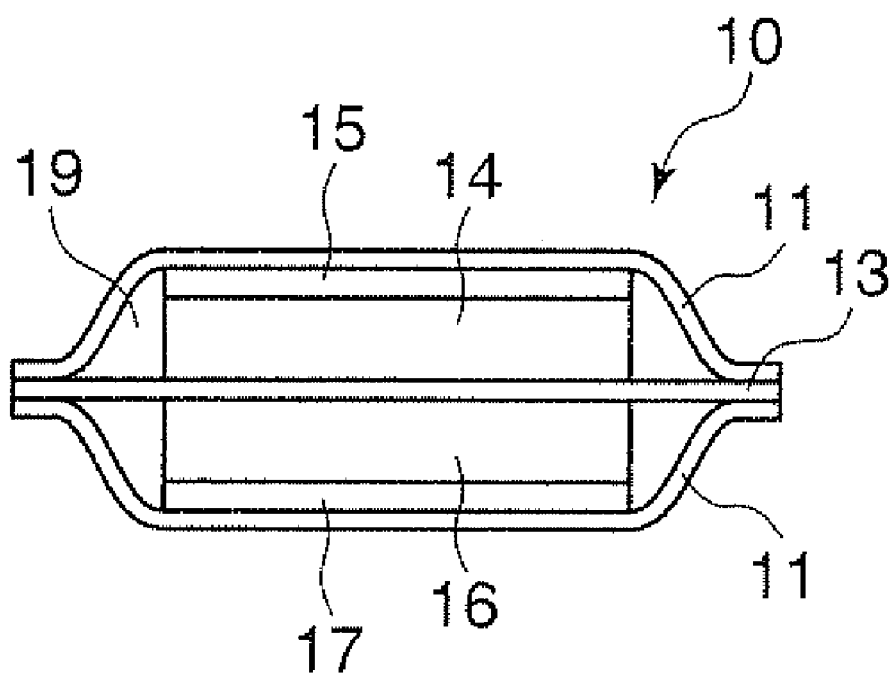
FIG. 9A is a view showing a non-aqueous electrolyte secondary battery.
Figure 9B:
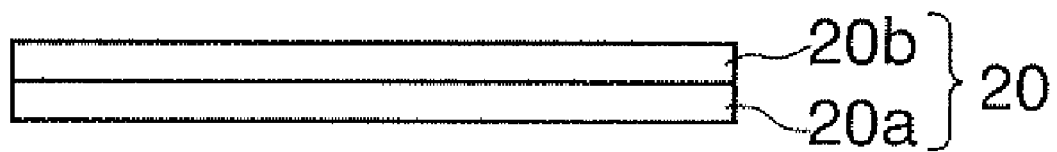
FIG. 9B is a view showing an electrode plate for a non-aqueous electrolyte secondary battery.

An electrode plate 20 for a non-aqueous electrolyte secondary battery of this embodiment includes a current collector 20a and an electrode active material layer 20b formed on at least a part of the surface of the current collector 20a, as shown in FIG. 9B. The electrode active material layer 20b contains a particulate electrode active material, a binding material, and carbonic matter distinct from conductive materials. The binding material is an amorphous metal oxide that does not cause alkaline metal ion intercalation and deintercalation reactions. The electrode active material layer, the current collector, and the method for evaluating the charge and discharge rate characteristics of the electrode plate will be described hereinafter in order.

(Electrode Active Material Layer)

The electrode active material layer is formed by a particulate electrode active material that is fixed to a current collector not by means of a resin binder, which is used in the prior art, but by means of an amorphous metal oxide that does not cause alkaline metal ion (e.g., lithium ion) intercalation and deintercalation reactions, and the electrode active material layer contains carbonic matter distinct from conductive materials.

The selection of thickness for the electrode active material layer may be made in consideration of the electric capacity and the output and input characteristics required for the electrode plate. An electrode plate is usually designed so that its electrode active material layer has a thickness of 200 µm or less, typically 100 µm or more and 150 µm or less. In this embodiment, however, it is possible to form an electrode active material layer with an extremely small thickness, so that there can be obtained an electrode active material layer with a thickness of 300 nm or more and 200 µm or less, depending on the particle diameter of the particulate electrode active material used to form the electrode active material layer. It is particularly preferable to make the thickness of the electrode active material layer 300 nm or more and 30 µm or less, more preferably 500 nm or more and 11 µm or less, because an electrode active material layer with such a small thickness can provide an electrode plate having improved output and input characteristics and large capacity.

To form an electrode active material layer with such a small thickness as is in the above-described range, a particulate electrode active material with a small particle diameter is used The small particle diameter herein means that the particle diameter of the particulate electrode active material is smaller than at least the thickness of the electrode active material layer. The use of a particulate electrode active material with such a small particle diameter greatly contributes to the improvement in output and input characteristics. Moreover, when the electrode active material layer has such a small thickness, the distance of movement of electrons in the electrode active material layer, between the particulate electrode active material and the current collector, is short, so as to decrease resistivity between the electrode plates, which leads to improvement in output and input characteristics. It is therefore desirable that the thickness of the electrode active material layer be small.

In this embodiment, the lower limit of the thickness of the electrode active material layer depends chiefly on the particle diameter of the particulate electrode active material used to form the electrode active material layer. If it becomes possible to use a particulate electrode active material with a smaller particle diameter than ever, it will be able to form an electrode active material layer with a thickness smaller than the lower limit of the above-described range.

Furthermore, it is preferred that pores be present in the electrode active material layer to such an extent that an electrolyte can permeate the electrode active material layer. The porosity of the electrode active material layer is usually 15 to 40%, preferably 20 to 40%.

The ingredients of the electrode active material layer will be described hereinafter specifically.

Particulate Electrode Active Material:

The particulate electrode active material that is contained in the electrode active material layer may be any particulate cathode or anode active material that is usually used in the electrode plate of a non-aqueous electrolyte secondary battery, as long as it causes lithium ion intercalation and deintercalation reactions and can be charged and discharged. In this embodiment, the particles of the particulate electrode active material stick to each other and also to the current collector owing to a metal oxide present between the particles of the particulate electrode active material, and between the particulate electrode active material and the current collector, thereby forming an electrode active material layer on the current collector. The metal oxide acts as a binding material irrespective of the type or shape of the particles of the particulate electrode active material.

Further, the metal oxide in the electrode active material layer in this embodiment does not cause alkaline metal ion intercalation and deintercalation reactions, so that it does not affect any reaction of the particulate electrode active material as well. Also from this point of view, any particulate electrode active material can be used in the present invention without limitation. Of the particulate electrode active materials, the particulate cathode active material that can be used in e.g., lithium-ion secondary battery specifically includes particulate electrode active materials made of lithium-transition combined metal oxides such as $LiCoO_2$, $LiMn_2O_4$, $LiNiO_2$, $LiFeO_2$, $Li_4Ti_5O_{12}$ and $LiFePO_4$. Similarly, the particulate anode active material specifically includes particulate active materials made of natural graphite, synthetic graphite, amorphous carbon and carbon black; carbonaceous materials obtained by adding other elements to these materials; and materials that cause lithium ion intercalation and deintercalation reactions, such as metal oxides, e.g., $Li_4Ti_5O_{12}$, metallic lithium and its alloys, and tin and silicon and their alloys.

No limitations are imposed on the particle diameter of the particulate electrode active material for use in this embodiment, and a particulate electrode active material with any particle diameter may be selected and used herein. For attaining higher output and input characteristics, however, it is desirable to select a particulate electrode active material with a smaller particle diameter. This is because a particulate electrode active material with a smaller particle diameter presents a larger total surface area in the electrode active material layer. That the selection of particle diameter for the particulate electrode active material can be made without limitation is one of the advantageous features of this embodiment. In the production of a conventional electrode plate, it has been difficult to use a particulate electrode active material with a small particle diameter in an electrode active material layer-forming composition because such a particulate electrode active material makes the viscosity of the electrode active material layer-forming composition extremely high. On the other hand, in the electrode plate of this embodiment, a particulate electrode active material with any particle diameter can be contained in the electrode active material layer. It is therefore possible to make the total surface area of the particulate electrode active material in the electrode active material layer larger and also to make the distance of movement of lithium ion in one particle of the electrode active material shorter, which leads to considerable improvement in output and input characteristics. It is not clear why a particulate electrode active material with a smaller particle diameter than ever can be used in this embodiment. The reason, however, may be that a metallic-element-containing compound or an organometallic compound for forming a metal oxide is contained in the electrode active material layer-forming composition, in place of a resin binder, which has been used in the prior art.

More specifically, in the case where a particulate electrode active material with a particle diameter of 11 µm or less is selected, a conventional electrode active material layer-forming composition is to have a high viscosity value; it has been difficult to control the viscosity of such an electrode active material layer-forming composition, and the composition has been poor in handling properties. On the other hand, in the production of an electrode plate of this embodiment, even when a particulate electrode active material with a particle diameter of 11 µm or less is used, the electrode active material layer-forming composition does not suffer any problem concerning its viscosity and shows good handling properties. It is therefore easy to produce an electrode plate including an electrode active material layer that contains a particulate electrode active material with a particle diameter of 11 µm or less. For the purpose of attaining high output and input characteristics while retaining the handling properties of the electrode active material layer-forming composition, it is desirable in this embodiment to use a particulate electrode active material with a particle diameter of 11 µm or less.

Furthermore, for producing a conventional electrode plate that includes an electrode active material layer containing a resin binder, if a particulate electrode active material with a particle diameter of 5 µm or less is used in an electrode active material layer-forming composition, the electrode active material layer-forming composition has an excessively high viscosity value and is to have no fluidity. Such a composition has been unusable with a facility for mass-production, e.g., a printing machine. It is possible to increase the fluidity of the above electrode active material layer-forming composition by adding a large amount of a solvent, but if a large amount of a solvent is added, it takes a very long time to dry the electrode active material layer-forming composition applied to a current collector. Addition of a large amount of a solvent is thus impracticable, and it has been impossible to take this measure especially in the production of an electrode plate with the use of a wind-up machine. In this embodiment, on the other hand, even when a particulate electrode active material with a particle diameter of 5 µm or less is used in an electrode active material layer-forming composition, the electrode active material layer-forming composition has a moderate viscosity value and good fluidity, so that it can be used in the production of an electrode plate by a facility for mass-production. For this reason, for producing an electrode plate having high output and input characteristics by a facility for mass-production, it is desirable to use a particulate electrode active material with a particle diameter of 5 µm or less.

Furthermore, the difficulty in producing a conventional electrode plate that includes an electrode active material layer containing a resin binder with the use of a particulate electrode active material with a particle diameter of 1 µm or less is that the operation of dispersing the particulate electrode active material in an electrode active material layer-forming composition is difficult in itself. It has therefore been impossible to produce an electrode plate with the use of a particulate electrode active material with such a small particle diameter. In this embodiment, on the other hand, even a particulate electrode active material with a particle diameter of 1 µm or less can be satisfactorily dispersed in an electrode active material layer-forming composition, and an electrode active material layer containing such a particulate electrode active material can be formed on a current collector successfully. In this embodiment, therefore, the use of a particulate electrode active material with a particle diameter of 1 µm or less is highly advantageous and desirable. From the above point of view, it is preferable to select a particulate electrode active material with a particle diameter of 500 nm or less, more preferably 100 nm or less.

In the present invention and in this specification, the particle diameter of an electrode active material refers to the mean particle diameter obtained by laser diffraction/scattering particle-size-distribution measurement (volume median particle diameter; D50).

The particle diameter of the particles of the particulate electrode active material in the electrode active material layer can be determined by using an electron micrograph of the particulate electrode active material and a software for image-analysis-type particle size distribution measurement ("MAC VIEW" manufactured by MOUNTECH CO., LTD., Japan).

Metal Oxide Serving as Binding Material:

Any metal oxide may be formed in the electrode active material layer as a binding material, as long as it is an oxide of a metallic element that is generally understood as metal, and is an amorphous metal oxide that does not cause lithium ion intercalation and deintercalation reactions. Examples of the metallic element include Li, Be, Na, Mg, Al, Si, K, Ca, Sc, Ti, V, Cr, Mn, Fe, Co, Ni, Cu, Zn, Ga, Rb, Sr, Y, Zr, Nb, Mo, Tc, Ru, Rh, Pd, Ag, Cd, In, Sn, Cs, Ba, Hf, Ta, W, Re, Os, Ir, Pt, Au, Hg, Tl, Pb, Bi, Fr, Ra, and Ce.

Of the above-enumerated metallic elements, metallic elements of groups 3 to 5 of the periodic table are preferred. This is because in an electrode plate of this embodiment, when an oxide of a metallic element of groups 3 to 5 is present as a binding material in the electrode active material layer, the electrode plate shows more improved output and input characteristics, although the reasons for this is not clear. In other words, it is more preferred that a metal oxide containing a metallic element selected from the group consisting of Na, Mg, Al, Si, K, Ca, Sc, Ti, V, Cr, Mn, Fe, Co, Ni, Cu, Zn, Ga, Rb, Sr, Y, Zr, Nb, Mo, Tc, Ru, Rh, Pd, Ag, Cd, In and Sn be present as a binding material in the electrode active material layer.

Of the metal oxides containing metallic elements of group 3 to 5 of the periodic table, titanium oxide is particularly preferred. This is because titanium oxide is inexpensive, is easy to handle, and, moreover, can show an excellent output-and-input-characteristics-improving effect when it is contained in an electrode active material layer as a binding material. An electrode plate for a non-aqueous electrolyte secondary battery of this embodiment, including an electrode active material layer that contains titanium oxide as a binding material, can show a charge or discharge rate (percentage of discharge capacity retention) as high as 80% or more at a discharge rate of 50 C. This rate is high enough to use the electrode plate for a large-sized device such as an automobile.

The metal oxide in this embodiment may be either a metal oxide composed of one of the above-enumerated metallic elements that is combined with oxygen, or a combined metal oxide (complex metal oxide, composite metal oxide) containing two or more metallic elements selected from the metallic elements enumerated above. Examples of the metal oxide composed of a metallic element combined with oxygen include sodium oxide, magnesium oxide, aluminum oxide, silicon oxide, potassium oxide, calcium oxide, scandium oxide, titanium oxide, vanadium oxide, chromium oxide, manganese oxide, iron oxide, cobalt oxide, nickel oxide, zinc oxide, gallium oxide, strontium oxide, yttrium oxide, zirconium oxide, molybdenum oxide, ruthenium oxide, tantalum oxide, tungsten oxide, and cerium oxide.

Examples of the combined metal oxide that contains two or more metallic elements and that can be used as the metal oxide in this embodiment include cerium oxide doped with gadolinium, zirconium oxide doped with yttrium, a combined oxide of iron and titanium, a combined oxide of indium and tin, and nickel oxide doped with lithium.

The metal oxides enumerated as examples in this paragraph never restrict the metal oxide in the present invention. In the present invention, the metal oxide capable of serving, on a current collector, as a binding material for the particulate electrode active material may be any metal oxide, as long as it is amorphous, does not cause lithium ion intercalation and deintercalation reactions, and can fix the particulate electrode active material to a current collector in the absence of a resin binder. Moreover, the above-enumerated metal oxides may be present in the electrode active material layer either singly or in combination.

Proportion of Binding Material:

In this embodiment, the metal oxide and the particulate electrode active material may be present in the electrode active material layer in any proportion, and this proportion may be determined in consideration of the type and size of the particles of the particulate electrode active material used to form the electrode active material layer, the type of the metal oxide, the functions required for the electrode, and so forth. In general, when the electrode active material layer contains a larger amount of the particulate electrode active material, the electrode plate has a larger electric capacity. From this point of view, it can be said that the lower is the proportion of the metal oxide to the particulate electrode active material in the electrode active material layer, the better.

More specifically, in the electrode active material layer, the metal oxide may be present in an amount of 1 part by weight or more and 50 parts by weight or less for 100 parts by weight of the particulate electrode active material. When the metal oxide is present in an amount of less than 1 part by weight for 100 parts by weight of the particulate electrode active material, the particulate electrode active material sometimes cannot be fixed to a current collector satisfactorily.

On the other hand, the mention of the upper limit of the proportion of the metal oxide to the particulate electrode active material is not intended to exclude a case where the metal oxide is present in the electrode active material layer in a proportion exceeding the upper limit, but to show that it is possible to fix the particulate electrode active material to a current collector with a smaller amount of the metal oxide.

Crystallinity of Binding Material:

The metal oxide in this embodiment must be amorphous. In the present invention, that a metal oxide is amorphous means that the peaks representing the metal oxide are not observed on the X-ray diffraction pattern of the metal oxide or of a sample containing the metal oxide. Taking iron as an example of the metallic element, explanation will now be given with reference to the data actually obtained from the analyses of crystalline iron oxide and amorphous iron oxide carried out by X-ray diffractometry.

4.0 g of $Fe(NO_3)_3 \cdot 9H_2O$ (molecular weight: 404) was first mixed with 15 g of methanol, and to this mixture was added 10 g of ethylene glycol, thereby obtaining a sample solution. Subsequently, Sample 1 and Sample 2, glass substrates coated with the sample solution, were obtained. Sample 1 was heated at a temperature of 300° C. for 1 hour, and Sample 2, at a temperature of 500° C. for 1 hour. Scraping off the heated films on Samples 1 and 2, Analysis Samples 1 and 2 were obtained, respectively, and they were subjected to composition analyses. The result of the composition analysis of Analysis Sample 1 was as follows: 34 atomic % element iron and 66 atomic % element oxygen, The result of the composition analysis of Analysis Sample 2 was as follows: 38 atomic % element iron and 62 atomic % element oxygen. The results show that both the iron in Analysis Sample 1 and that in Analysis Sample 2 have been oxidized.

Figure 1:
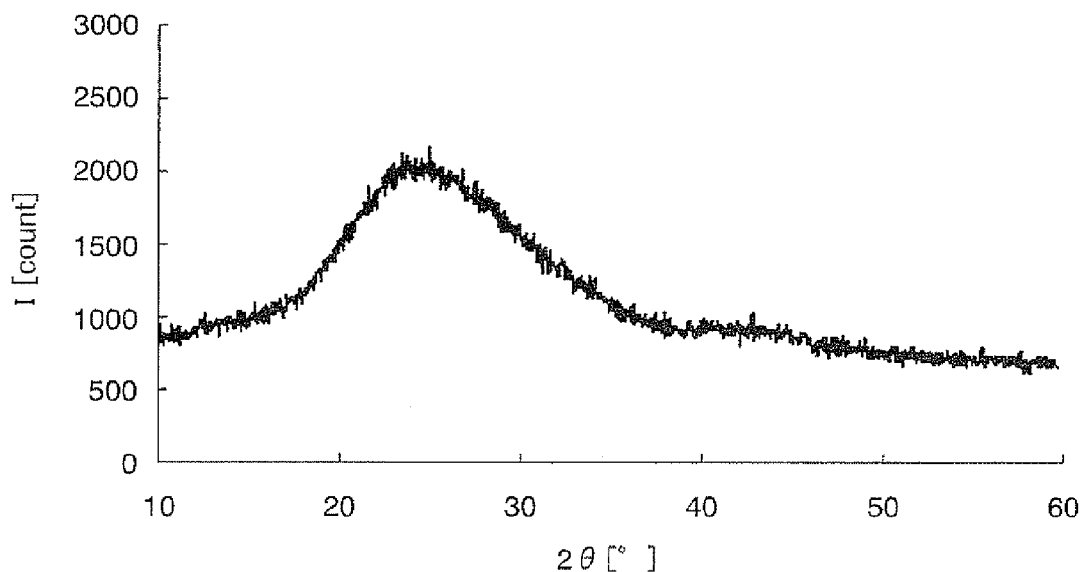
FIG. 1 is a chart showing the X-ray diffraction pattern of amorphous iron oxide.
Figure 2:
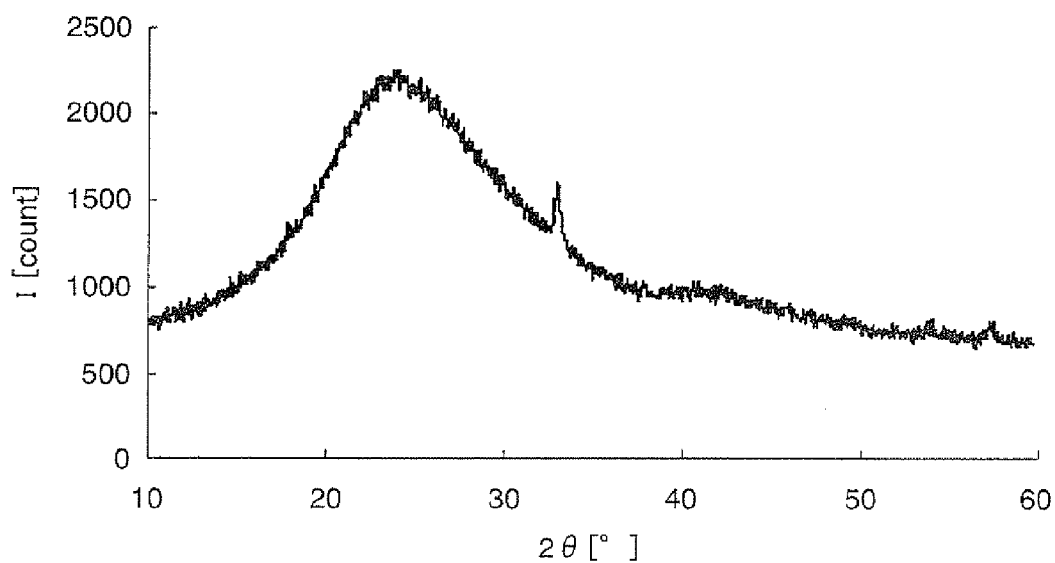
FIG. 2 is a chart showing the X-ray diffraction pattern of crystalline iron oxide.

The crystallinity of Analysis Sample 1 and that of Analysis Sample 2 were evaluated by X-ray diffractometry. The X-ray diffraction pattern of Analysis Sample 1 is shown in FIG. 1, and the X-ray diffraction pattern of Analysis Sample 2, in FIG. 2, The diffraction pattern shown in FIG. 1 is a broad continuum without peak. It can thus be understood that the iron oxide is amorphous. On the other hand, peaks are observed at around 32° and 58° on the diffraction pattern in FIG. 2. It is thus understood that crystalline iron oxide was formed on the glass substrate.

As described above, in the present invention, whether or not a metallic element has been oxidized to a metal oxide can be confirmed by a composition analysis, and whether the metal oxide is amorphous or crystalline can be confirmed by its X-ray diffractometer recording.

Alkaline Metal Ion Intercalation and Deintercalation Reactions:

Furthermore, the metal oxide in the present invention must not cause alkaline metal ion intercalation and deintercalation reactions. This means that the metal oxide must not electrochemically react with an alkaline metal ion such as lithium ion. If the metal oxide electrochemically reacts with an alkaline metal ion, the reaction entails expansion of the metal oxide, or yields a reaction product. The electrode active material containing the metal oxide that does not chemically react with an alkaline metal ion is thus prevented from deterioration that occurs due to the expansion of the metal oxide, the defect of the electrode active material layer, etc.

An electrochemical measuring method (cyclic voltammetry: CV) can be used to judge whether or not the metal oxide causes lithium ion intercalation and deintercalation reactions.

Figure 4:
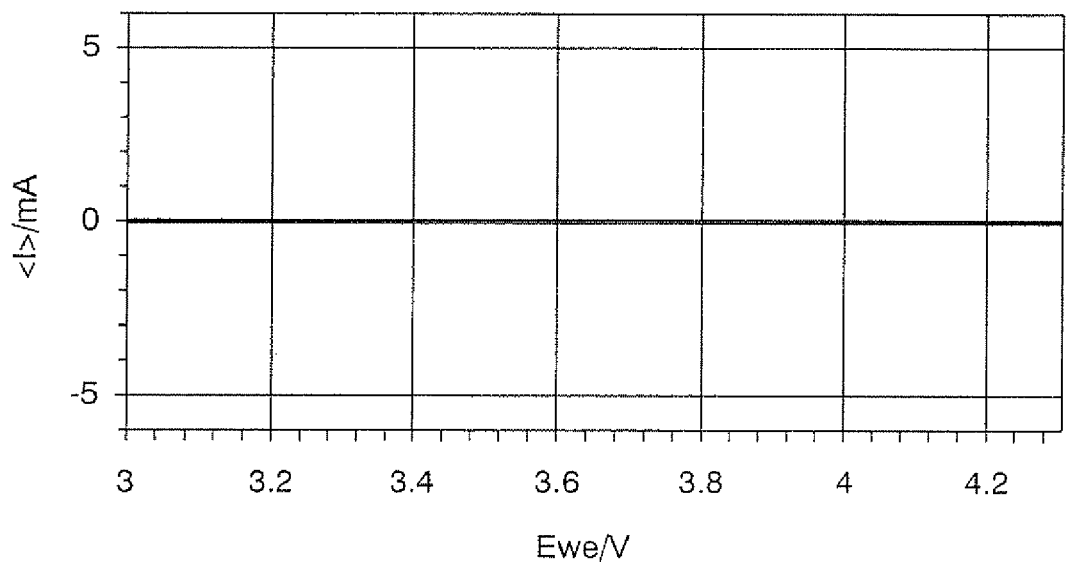
FIG. 4 is a cyclic voltammogram obtained from a cyclic voltammetry test made on a metal oxide that does not cause lithium ion intercalation and deintercalation reactions.

Explanation of a CV test will be given below. Specifically, the measurement is carried out by repeating about three times the operation of sweeping the electrode potential within the voltage range optimal to the active material, e.g., from 3.0 V to 4.3 V if the alkaline metal is lithium ion, and the metal oxide is $LiMn_2O_4$, and returning it to 3.0 V. In this operation, the scanning rate is preferably 1 mV/sec. In the case of $LiMn_2O_4$, a peak representing oxidation that is equivalent to the lithium deintercalation reaction of $LiMn_2O_4$ appears at around 3.9 V, and a peak representing reduction that is equivalent to the lithium intercalation reaction of $LiMn_2O_4$ appears at around 4.1 V. In this manner, it is possible to judge whether or not the metal oxide causes lithium ion intercalation and deintercalation reactions. If no peak appears as in FIG. 4, it can be judged that the metal oxide does not cause lithium ion intercalation and deintercalation reactions.

In the present invention, that the metal oxide does not cause lithium ion intercalation and deintercalation reactions does not mean that the metal oxide has this feature as its inherent electrical property, but means that the metal oxide present in the electrode active material layer as a binding material does not cause lithium ion intercalation and deintercalation reactions in a range of voltage suitable for the particulate electrode active material in the electrode active material layer. This is because it is important for the electrode plate that the metal oxide intercalates and deintercalates substantially no lithium ion.

Before producing the electrode plate for a non-aqueous electrolyte secondary battery, whether or not the metal oxide that will be formed in the electrode active material layer causes lithium ion intercalation and deintercalation reactions can be checked in the above-described manner. It is therefore possible to allow a metal oxide that has been checked beforehand that it does not cause lithium ion intercalation and deintercalation reactions to exist in the electrode active material layer as a binding material. On the other hand, whether or not a metal oxide that does not cause lithium ion intercalation and deintercalation reactions is present in the electrode active material layer in the completed electrode plate can be checked in the following manner, for example. A sample obtained by scraping the electrode active material layer is subjected to a composition analysis, and from the result of the analysis, it is possible to estimate what metal oxide is present in the sample. A film of the estimated metal oxide is formed on a substrate such as a glass plate. By subjecting this laminate to a cyclic voltammetry test, it is possible to judge whether the metal oxide causes lithium ion intercalation and deintercalation reactions or not.

Conductive Material:

A conductive material may be optionally included in the electrode active material layer in the electrode plate. In general, incorporation of a conductive material in an electrode active material layer makes electron conduction between an electrode active material in the electrode active material layer and a current collector better, and can efficiently decrease the volume resistivity of the electrode active material layer itself. It is therefore desirable to incorporate a conductive material in the electrode active material layer. Examples of the conductive material useful herein include those conductive materials that are usually used in electrode plates for non-aqueous electrolyte secondary batteries, e.g., conductive carbonaceous materials such as particulate carbon blacks, e.g., acetylene black and ketjen black. It is preferred that the mean primary particle diameter of the conductive material be from about 20 to 50 nm. Another known conductive material useful herein is carbon fiber such as VGCF. The carbon fiber can conduct electricity in the longitudinal direction thereof very well and can improve the flow of electricity. The length of the fiber is from about 1 μm to 20 μm. It is therefore possible to obtain the improved effect of the addition of a conductive material by the combination use of carbon fiber and the above-described particulate conductive material such as acetylene black. Electrical resistance is usually used to express the conductivity of a conductive material; the above conductive materials have values of electrical resistance of about 0.14 to 0.25 Ωcm.

The mean primary particle diameter of the particles of a conductive material is the arithmetic mean value of the particle diameters actually measured with an electron microscope as in the measurement of the particle diameter of a particulate active material.

Although the conductive material may optionally be incorporated in the electrode active material layer in any amount, it is usually used in an amount of 5 parts by weight or more and 20 parts by weight or less for 100 parts by weight of the particulate electrode active material.

Carbonic Matter Distinct from Conductive Materials:

The electrode active material layer contains carbonic matter distinct from conductive materials (hereinafter also referred to simply as "carbonic matter"). The carbonic matter is distinct also from the above-described conductive material that is optionally added, and especially in an anode plate, the carbonic matter is present in the electrode active material layer separately from the particulate anode active material.

When the amount of the carbon source detected by a composition analysis of the electrode active material layer in the completed electrode plate is greater than the amount of carbon originating from the electrode active material and from the conductive material, it can be usually judged that carbonic matter is present in the electrode active material layer. When the amount of the carbonic matter is extremely small, there may be a case where the carbonic matter is not detected by the composition analysis. The inventors confirmed that even if the amount of the carbonic matter present in the electrode active material layer is extremely small, the carbonic matter can contribute to the improvement of the output and input characteristics of the electrode plate. For example, a preliminary experiment is carried out in the following manner: an electrode active material layer-forming composition to which a conductive material is not added yet is applied to a substrate, and the coating film thus formed on the substrate is heated at a proper temperature. The presence of carbonic matter in the coating film is preliminarily confirmed in this manner. After this experiment, an electrode active material layer-forming composition to which a conductive material is added is applied to a current collector, and is then heated under the same conditions as in the preliminary experiment. It is understood that in the electrode plate obtained in this manner, carbonic matter other than carbon making up the conductive material remains in the electrode active material layer irrespective of the result of the composition analysis of the electrode active material layer.

More specifically, the presence of the carbonic matter in the electrode active material layer can be confirmed by the presence of element carbon that can be confirmed by observing, by the scanning transmission electron microscopy (STEM) using a transmission electron microscope (TEM), an element map obtained from a nano-order elementary analysis using an EDX detector. It is possible to confirm the presence of carbonic matter in the electrode active material layer also by the nano-order evaluation of the state of the electrode active material layer with an EELS spectrometer, or by a composition contrast image obtained with an HAADF detector. The above technique using an element map or a composition contrast image is more useful for an anode plate than for a cathode plate. The reason for this is as follows. A particulate anode active material such as graphite, or a particulate conductive material, is present in an electrode active material layer in the form of an aggregate of nearly 100% carbon atoms. The graphite or conductive material is therefore observed as a concentration of carbon atoms on an element carbon map in the STEM or the like. On the other hand, the above carbonic matter is not an aggregate of carbon atoms as large as that of carbon atoms of the conductive material, and the presence of the carbonic matter can be confirmed by element carbon scatteringly present in the other ingredients. The presence of the carbonic matter can therefore be confirmed by element carbon sporadically present in the electrode active material on an element carbon map.

The carbonic matter may also be present in the metal oxide in the electrode active material layer. When the metal oxide, binding material, is formed in the electrode active material layer, there is a case where carbonic matter is involved in the metal oxide. Even in this case, there can be obtained the effects of improving high output and input characteristics and of retaining good working characteristics.

The carbonic matter is originating from carbon in the ingredients of the electrode active material layer-forming composition, such as an organic material and an organometallic compound, which will be described later. The carbonic matter can be obtained by allowing the above carbon to remain in the electrode active material layer, which is formed by the electrode active material layer-forming composition, by controlling e.g., the heating temperature in the process thereof. This is to say, however, not the only method for making the carbonic matter remain in the electrode active material layer, and some other methods can be employed.

More specifically, a preliminary experiment is carried out as follows: First, a coating film is formed on a substrate by applying, to a substrate, an electrode active material layer-forming composition to which a conductive material and a carbonaceous material such as a particulate anode active material made of graphite are not added yet, and heating the coating film thus formed on the substrate is heated at a proper heating temperature or in a proper heating atmosphere. Then the presence of carbonic matter in the coating film is preliminary confirmed. Subsequently, an electrode active material layer-forming composition prepared with the use of all the essential ingredients is applied to a current collector, and is then heated under the same conditions as in the preliminary experiment. In this manner, there can be obtained an electrode plate having an electrode active material layer that contains carbonic matter other than the conductive material and the carbonaceous material such as a particulate anode active material made of graphite.

In this embodiment in which the metal oxide is used as a binding material, more improved output and input characteristics can be obtained by making carbonic matter distinct from conductive materials present in the electrode active material layer. Moreover, the inventors found that the electrode active material layer in which the carbonic matter is present is improved in softness and shows good working properties as ever, although the electrode active material layer does not contain a resin binder. Such an electrode active material layer does not peel off a current collector, or the particles of the particulate electrode active material do not fall off the electrode active material layer, even if an electrode plate having the electrode active material layer is bent when it is processed, or when producing a non-aqueous electrolyte secondary battery with the use of the electrode plate. The electrode active material layer containing the carbonic matter can therefore provide an extremely excellent electrode plate.

The carbonic matter distinct from conductive materials may be present in the electrode active material in any amount. Even when the carbonic matter is present in the electrode active material in such an extremely small amount that the carbon matter cannot be detected by an ordinary method of composition analysis, the carbon matter can contribute to the production of an electrode plate improved in output and input characteristics.

For example, there is a case where the metal oxide serving as a binding material contains the above carbonic matter. In this case, it is preferred that the amount of the carbonic matter contained in the metal oxide be 10 mol % or more for 100 mol % of the metallic element contained in the metal oxide. Although the range of the amount of the carbonic matter in the metal oxide has no upper limit, the carbonic matter present in the metal oxide in an amount of 50 mol % or less of the metallic element is enough to contribute to the improvement in output and input characteristics and working properties.

Other Additives:

The electrode active material layer contains at least the particulate electrode active material, the metal oxide serving as a binding material, and the carbonic matter distinct from conductive materials, and a conductive material may be optionally added to these ingredients. The electrode active material layer may further optionally contain any other additives within the scope of the present invention.

(Current Collector)

Any current collector that is usually used as an electrode current collector in an electrode plate for a non-aqueous electrolyte secondary battery can be used herein. For example, aluminum foil, nickel foil, or the like can be used as a cathode current collector; and copper foil, aluminum foil, nickel foil, or the like can be favorably used as an anode current collector.

The current collector in this embodiment can have any thickness that is practicable for the current collector of a conventional electrode plate for a non-aqueous electrolyte secondary battery. It is, however, preferred that the thickness of the current collector be from 10 to 100 μm, more preferably from 15 to 50 μm.

(Method for Evaluating Charge & Discharge Rate Characteristics of Electrode)

The output and input characteristics of an electrode plate can be evaluated by the percentage of discharge capacity retention. In other words, the percentage of discharge capacity retention can be used to evaluate discharge rate characteristics, and it is generally understood that an electrode plate improved in discharge rate characteristics is improved also in charge rate characteristics. It is therefore considered that an electrode plate showing a desirable percentage of discharge capacity retention is improved in charge and discharge rate characteristics and is thus improved in output and input characteristics. More specifically, the percentage of discharge capacity retention can be obtained in the following manner. The discharge rate 1 C is set so that the theoretical discharge capacity (mAh/g) of the active material can be completely discharged in 1 hour, and the discharge capacity value (mAh/g) actually measured at the discharge rate 1C is taken as 100% discharge capacity retention. The discharge capacity values (mAh/g) are measured at increased discharge rates. Using the following Equation 1, the percentage of discharge capacity retention at each discharge rate is calculated.

[percentage of discharge capacity retention (%)]=[discharge capacity at each discharge rate (mAh/g)]/[discharge capacity at 1 C (mAh/g)]×100  [Equation1]

The charge and discharge rate characteristics of an electrode plate vary depending on the type and particle diameter of the particulate electrode active material used for the electrode active material layer, the amount of the metal oxide serving as a binding material, contained in the electrode active material layer, the thickness of the electrode active material layer, and so forth. In general, as for the charge and discharge rate characteristics of an electrode plate for a non-aqueous electrolyte secondary battery, it is desirable that the percentage of discharge capacity retention be 50% or more at a discharge rate of 50 C or more, and it is more desirable that the percentage of discharge capacity retention be 50 % or more at a discharge rate of 100 C or more. An electrode plate showing a percentage of discharge capacity retention in the above range is rated as good in charge and discharge characteristics. An electrode plate of this embodiment can show the above-described high charge and discharge rate characteristics. It should be noted, however, that a discharge rate of 2000 C or more demands a system capable of withstanding heavy current.

Further, if the charge and discharge rate characteristics of an electrode plate for a non-aqueous electrolyte secondary battery are evaluated from another point of view, it can generally be said that a higher percentage of discharge capacity retention is more desirable. It is desirable that the percentage of discharge capacity retention be 50% or more, preferably 80% or more, more preferably 100%, at a discharge rate of 50C. An electrode plate for a non-aqueous electrolyte secondary battery of this embodiment can show such a high percentage of discharge capacity retention.

The aforementioned electrode plate for a non-aqueous electrolyte secondary battery according to this embodiment includes an electrode active material layer formed by a particulate electrode active material that is fixed to a current collector without using a resin binder, which has been used in the prior art, owing to the presence of a metal oxide that is amorphous and that does not cause alkaline metal ion intercalation and deintercalation reactions. The electrode plate of this embodiment can exhibit extremely high output and input characteristics, as compared with a conventional electrode plate for a non-aqueous electrolyte secondary battery, using a resin binder, even when the particulate electrode active material and its amount used for the electrode plate of this embodiment are the same as those used for the conventional electrode plate. Moreover, when the electrode active material layer in this embodiment further contains carbonic matter distinct from conductive materials, the electrode plate shows extremely desirable output and input characteristics. Besides, this electrode plate is excellent in the adhesion of the electrode active material layer to the current collector, i.e., good in film-forming properties, like a conventional electrode plate containing an electrode active material layer using a resin binder.

Furthermore, the inventors realized the following. When a metal oxide is made to exist as a binding material in an electrode active material layer containing no resin binder, the electrode active material layer tends to have slightly decreased softness and thus to have slightly decreased working properties, as compared with a conventional electrode active material layer containing a resin binder. On the other hand, according to this embodiment described above, it is possible to provide an electrode plate excellent in working properties comparable to a conventional electrode plate, by allowing the above-described carbonic matter to exist in the electrode active material layer of the electrode plate, without using a resin binder.

[Method for Producing Electrode Plate for Non-Aqueous Electrolyte Secondary Battery]

A first embodiment of the production method of the present invention is as follows. An electrode active material layer-forming composition containing at least a particulate electrode active material, a metallic-element-containing compound for forming a metal oxide that serves a binding material, containing one, or two or more metallic elements, and an organic material capable of giving carbonic matter distinct from conductive materials is first prepared. Using the above electrode active material layer-forming composition, the following application and heating steps are conducted successively.

Before preparing the electrode active material layer-forming composition, a metallic-element-containing compound capable of forming, in the heating step, a metal oxide that does not cause alkaline metal ion intercalation and deintercalation reactions is selected as the above metallic-element-containing compound.

A temperature that is equal to or higher than the temperature at which the metallic-element-containing compound begins to decompose thermally, that is less than the crystalline temperature of the metal oxide that is formed in the heating step, and at which carbon originating from the organic material can remain in the electrode active material layer as carbonic matter distinct from conductive materials is selected as the heating temperature in the heating step.

A second embodiment of the production method of the present invention is as follows. An electrode active material layer-forming composition containing at least a particulate electrode active material, and an organometallic compound containing one, or two or more metallic elements, selected as a material for forming a metal oxide that serves as a binding material is prepared. Using the above electrode active material layer-forming composition, the following application and heating steps are conducted successively.

Before preparing the electrode active material layer-forming composition, an organometallic compound capable of forming, in the heating step, a metal oxide that does not cause alkaline metal ion intercalation and deintercalation reactions is selected as the above organometallic compound.

A temperature that is equal to or higher than the temperature at which the organometallic compound begins to decompose thermally, that is less than the crystalline temperature of the metal oxide that is formed in the heating step, and at which carbon originating from the organometallic compound can remain in the electrode active material layer as carbonic matter distinct from conductive materials is selected as the heating temperature in the heating step.

A third embodiment of the production method of the present invention is as follows. An electrode active material layer-forming composition containing at least a particulate electrode active material, an organometallic compound containing one, or two or more metallic elements, selected as a material for forming a metal oxide that serves as a binding material, and an organic material capable of giving carbonic matter distinct from conductive materials is prepared. Using the above electrode active material layer-forming composition, the following application and heating steps are conducted successively.

Before preparing the electrode active material layer-forming composition, an organometallic compound capable of forming, in the heating step, a metal oxide that does not cause alkaline metal ion intercalation and deintercalation reactions is selected as the organometallic compound.

A temperature that is equal to or higher than the temperature at which the organometallic compound begins to decompose thermally, that is less than the crystalline temperature of the metal oxide that is formed in the heating step, and at which carbon originating from at least one of the organometallic compound and the organic material can remain in the electrode active material layer as carbonic matter distinct from conductive materials is selected as the heating temperature in the heating step.

In each of the above first to third embodiments, the following must be taken into consideration in the preparation of the electrode active material layer-forming composition: materials containing carbon must be used as the ingredients of the electrode active material layer-forming composition, other than a conductive material that is optionally added to the composition, in order to make carbonic matter distinct from conductive materials remain in the electrode active material layer that will be formed in the heating step. This means that it is necessary to incorporate, in the electrode active material layer-forming composition, at least an organic material capable of giving carbonic matter distinct from conductive materials or an organometallic compound capable of forming a metal oxide. The production method will be described hereinafter more specifically.

Particulate Electrode Active Material:

The particulate electrode active material that is incorporated in the electrode active material layer-forming composition is the same as the one described above, so that its explanation is not given here. In the method for producing an electrode plate of this invention, the desired particle diameter can be selected for the particulate electrode active material, which is the same as in the above description.

Binding-Material-Forming Material:

In the production method of the present invention, either a metallic-element-containing compound or an organometallic compound can be contained in the electrode active material layer-forming composition as a material for forming the intended metal oxide. The metallic-element-containing compound and the organometallic compound will be sometimes collectively referred to as a binding-material-forming material in the following description.

The binding-material-forming material is for forming a metal oxide that serves as a binding material useful for fixing the particulate electrode active material to a current collector.

The binding-material-forming material is decomposed thermally and oxidized to form a film, when it is heated on a substrate at a temperature equal to or more than the temperature at which the binding-material-forming material begins to decompose thermally. In an attempt to consider the subject of the present invention, the inventors studied incorporation of a particulate electrode active material in a metal oxide film during formation of a thin film of the metal oxide on a substrate, and found that the particulate electrode active material can be fixed to the substrate owing to the presence of the metal oxide even if the amount of the metal oxide is decreased. On the basis of the idea of using no resin binder and adding a particulate electrode active material to the above binding material capable of forming a film, the inventors prepared a composition containing a binding-material-forming material and a particulate electrode active material, applied the composition to a current collector, and heated it. As a result, the inventors found that the particulate electrode active material can be fixed to the current collector even when the binding material formed on the current collector is in an amount significantly decreased to such an extent that the binding material is present in the electrode active material layer composed chiefly of the particulate electrode active material.

Any material can be selected within the scope of the invention as the binding-material-forming material for use in the production method of the present invention, as long as it can be thermally decomposed and contains a metallic element which can be oxidized to form a film, and forms, on a current collector, a binding material that does not cause alkaline metal ion (e.g., lithium ion) intercalation and deintercalation reactions.

Particularly, of the binding-material-forming materials, the organometallic compound is a material that forms a binding material, and at the same time, a compound that can give carbon atom as carbonic matter which is contained in an electrode active material layer and which is distinct from conductive materials.

That a binding material to be formed from a binding-material-forming material to be used does not cause alkaline metal ion intercalation and deintercalation reactions can be confirmed beforehand by a preliminary experiment that is carried out in the following manner: a solution containing the binding-material-forming material is applied to a substrate and is then heated, thereby forming the binding material, and this sample is subjected to the above-described cyclic voltammetry test.

Metallic-Element-Containing Compound:

Specifically, any compound containing one, or two or more metallic elements selected from the group consisting of general elements such as Li, Be, Na, Mg, Al, Si, K, Ca, Sc, Ti, V, Cr, Mn, Fe, Co, Ni, Cu, Zn, Ga, Rb, Sr, Y, Zr, Nb, Mo, Tc, Ru, Rh, Pd, Ag, Cd, In, Sn, Cs, Ba, Hf, Ta, W, Re, Os, Ir, Pt, Au, Hg, Tl, Pb, Bi, Fr, Ra, and Ce can be used herein as the metallic-element-containing compound.

Although the reason is not clear, the use of a metallic-element-containing compound containing a metallic element of groups 3 to 5 of the periodic table, among the above-enumerated metallic elements, tends to provide an electrode plate more improved in output and input characteristics. In other words, it is preferable to use a metallic-element-containing compound containing one, or two or more metallic elements selected from the group consisting of Na, Mg, Al, Si, K, Ca, Sc, Ti, V, Cr, Mn, Fe, Co, Ni, Cu, Zn, Ga, Rb, Sr, Y, Zr, Nb, Mo, Tc, Ru, Rh, Pd, Ag, Cd, In and Sn.

Further, e.g., a metal salt is favorably used herein as the metallic-element-containing compound containing the above metallic element(s). Examples of the metal salt include chlorides, nitrates, sulfates, perchlorates, phosphates and bromates. Of these, chlorides and nitrates are preferably used herein because they are readily available as general-purpose products. Since nitrates are inexpensive, their use is particularly preferred.

Specific examples of the metal salt include magnesium chloride, aluminum nitrate, aluminum chloride, calcium chloride, titanium tetrachloride, vanadium oxysosulfate, ammonium chromate, chromium chloride, ammonium dichromate, chromium nitrate, chromium sulfate, manganese nitrate, manganese sulfate, iron (I) chloride, iron (III) chloride, iron (III) nitrate, iron (II) sulfate, ammonium iron (III) sulfate, cobalt chloride, cobalt nitrate, nickel chloride, nickel nitrate, copper chloride, copper nitrate, zinc chloride, yttrium nitrate, yttrium chloride, zirconium oxide chloride, zirconium oxide nitrate, zirconium tetrachloride, silver chloride, indium nitrate, tin sulfate, cerium chloride, cerium nitrate, cerium diammonium nitrate, cerium sulfate, samarium chloride, samarium nitrate, lead chloride, lead nitrate, lead iodide, lead phosphate, lead sulfate, lanthanum chloride, lanthanum nitrate, gadolinium nitrate, strontium chloride, strontium nitrate, niobium pentachloride, ammonium molybdenate phosphate, molybdenum sulfate, paradium chloride, paradium nitrate, antimony pentachloride, antimony trichloride, antimony trifluoride, telluric acid, barium sulfite, barium chloride, barium chlorinate, barium perchlorinate, barium nitrate, tungstenic acid, ammonium tungstenate, tungsten hexachloride, tantalum pentachloride, hafnium chloride, and hafnium sulfate.

Organometallic Compound:

The organometallic compound herein refers to a compound composed of metal and carbon, and both metal complexes containing element carbon and metal salts containing element carbon are included in the organometallic compound. More specifically, the organometallic compound may be any compound containing one, or two or more metallic elements selected from the group consisting of the general metallic elements enumerated in the above description of the metallic-element-containing compound, and carbon. Of the metallic elements of the above group, a metallic element of groups 3 to 5 of the periodic table is particularly preferred as a component of the organometallic compound, and this is the same as in the case of the metallic-element-containing compound.

Examples of the above metal salt include acetates and oxalates. Of these, acetates are preferably used because they are readily available as general-purpose products.

Specific examples of the metal salt include scandium acetate, chromium acetate, iron (II) acetate, cobalt acetate, nickel acetate, zinc acetate, silver acetate, indium acetate, cerium acetate, cerium oxalate, lead acetate, lanthanum acetate, strontium acetate, paradium acetate, and barium acetate.

Examples of the metal complex include magnesium diethoxide, aluminum acetylacetonate, calcium acetylacetonate dihydrate, calcium di(methoxtethoxide), calcium gluconate monohydrate, calcium succinate tetrahydrate, calcium salicylate dihydrate, titanium lactate, titanium acetylacetonate, tetraisopropyl titanate, tetra normalbutyl titanate, tetra (2-ethylhexyl)titanate, butyl titanate dimer, titanium bis(ethylhexoxy)bis(2-ethyl-3-hydroxyhexoxide), diisopropoxytitanium bis(triethanolaminate), dihydroxybis (ammoniumlactate)titanium, diisopropoxy titanium bis (ethylacetoacetate), titanium ammonium peroxosuccinate tetrahydrate, dicyclopentadienyl iron (II), iron (II) lactate trihydrate, iron (III) acetylacetonate, cobalt (II) acetylacetonate, nickel (II) acetylacetonate dihydrate, copper (II) acetylacetonate, copper (II) dipivaloyl methanate, copper (H) ethylacetoacetate, zinc acetylacetonate, zinc lactate trihydrate, zinc salicylate trihydrate, zinc stearate, strontium dipivaloyl methanate, yttrium dipivaloyl methanate, zirconium tetra-n-buthoxide, zirconium (IV) ethoxide, zirconium n-propylate, zirconium n-butylate, zirconium tetraacetylacetonate, zirconium monoacetylacetonate, zirconium acetylacetonate bis-ethylacetoacetate, zirconium acetate, zirconium monostearate, penta-n-buthoxy niobium, pentaethoxy niobium, pentaisopropoxy niobium, indium (III) tris(acetylacetonate), indium (III) 2-ethylhaxanate, tetraethyl tin, dibutyl tin (IV) oxide, tricyclohexyl tin (IV) hydroxide, lanthanum acetylacetonate dihydrate, tri(methoxyethoxy) lanthanum, pentaisopropoxy tantalum, pentaethoxy tantalum, tantalum (V) ethoxide, cerium (III) acetylacetonate n.hydrate, lead (II) succinate trihydrate, and lead cyclohexane lactate.

The above-described organometallic compound is distinct from the metallic-element-containing compound by its containing carbon. Although both the metallic-element-containing compound and the organometallic compound are binding-material-forming materials, the following should be kept in mind when use: it is possible to make element carbon in the organometallic compound remain in an electrode active material layer as carbonic matter distinct from conductive materials; and in order to allow the element carbon to remain in the electrode active material layer, it is necessary to control the heating temperature in the heating step properly. Explanation of the heating temperature will be given later.

Besides the binding-material-forming materials specifically enumerated above, other materials that can be defined as compounds containing metallic elements can be used within the scope of the present invention. In other words, any material can be used for an electrode active material layer that is formed in an electrode plate for a non-aqueous electrolyte secondary battery in the method of the present invention, as long as it can form a metal oxide that serves as a binding material capable of fixing a particulate electrode active material to a current collector.

Organic Material:

Furthermore, an organic material distinct from the above organometallic compound can be used as another compound useful for providing the above carbonic matter that is made to remain in the electrode active material layer. Specific examples of the organic material include urethane resin, epoxy resin, ethyl cellulose, starch, polyethylene oxide, polyvinyl alcohol, and polyethylene glycol. In the preparation of the above electrode active material layer-forming composition, these organic materials show the effect of controlling the viscosity of the composition. By incorporating the organic material serving also as a viscosity modifier in the electrode active material layer-forming composition, applying the composition to a current collector, and then heating the applied composition at a proper temperature, it is possible to make carbonic matter remain in the electrode active material layer formed on the current collector.

To the electrode active material layer-forming composition, conductive materials and other additives may further be added within the scope of the invention.

Solvent:

Any solvent can be used in the electrode active material layer-forming composition, as long as it can provide a composition containing the particulate electrode active material, the binding-material-forming material, the organic material, and other additives, and moreover, can be removed, in the heating step, from the composition applied to a current collector. The solvent used to prepare the electrode active material layer-forming composition can be a solvent selected from lower alcohols having five or less carbon atoms, such as methanol, ethanol, isopropanol, propanol, and butanol; diketones such as acetylacetone, diacetylacetone, and benzoylacetone; ketoesters such as ethyl acetoacetate, ethyl pyruvate, ethyl benzoyl acetate, and ethyl benzoyl formate; toluene; and the like, or a solvent mixture of two or more solvents selected from the above-enumerated ones.

Before preparing the electrode active material layer-forming composition, the amount of the particulate electrode active material to be used, the amount of the binding-material-forming material to be used, the amount of the organic material to be used, and the amounts of other optional additives to be used are determined so that the electrode active material layer that will be formed on a current collector can contain these ingredients in necessary amounts. In determining the above amounts, the solid matter content of the electrode active material layer-forming composition is properly adjusted in consideration of the coating properties that the composition exhibits when it is applied to a current collector in the application step, as well as the removability of the solvent in the heating step. In general, the electrode active material layer-forming composition is prepared so that it has a solid matter content of 30 to 70% by weight.

Application Step:

Next, explanation of the step of applying the electrode active material layer-forming composition prepared in the above-described manner to a current collector, thereby forming a coating film on the current collector, will be given hereinafter. The current collector that is used in the production method of this embodiment is the same as the current collector that is used in the aforementioned electrode plate for a non-aqueous electrolyte secondary battery, so that its explanation is not given here.

To apply the electrode active material layer-forming composition to a current collector in the application step, there can be used any method selected from known methods of application. For example, the electrode active material layer-forming composition can be applied to any part of the surface of a current collector by means of printing, spin coating, dip coating, bar coating, spray coating, or the like, thereby forming a coating film. If the surface of a current collector is porous, or has a large number of irregularities, or is three-dimensional, the application of the electrode active material layer-forming composition can be done also by hand. It is preferable to subject the current collector beforehand to such surface treatment as corona discharge treatment or oxygen plasma treatment, as needed, because if the surface of the current collector has been so treated, the electrode active material layer can show more improved film-forming properties.

The amount of the electrode active material layer-forming composition to be applied to the current collector may be determined freely in consideration of the intended use of the electrode plate to be produced, and the like. In this embodiment, it is possible to make the electrode active material layer extremely thin, as mentioned above. If a thinner electrode active material layer is desired, the electrode active material layer-forming composition may be applied thinly so that the composition forms an electrode active material layer with a thickness of about 300 nm to 11 µm in the heating step that will be described later. By applying the electrode active material layer-forming composition to a current collector in the above-described manner, there is formed an electrode active material layer-forming coating film (hereinafter sometimes referred to simply as a "coating film") containing at least the particulate electrode active material and the binding-material-forming material (i.e., the metallic-element-containing compound or the organometallic compound), and optionally the organic material.

Heating Step:

Next, the step of heating the coating film formed in the above application step will be explained. The heating step is performed for the purposes of thermally decomposing the binding-material-forming material in the coating film into an amorphous metal oxide containing a metallic element that is a component of the binding-material-forming material, and of removing the solvent from the coating film. For this step, it is necessary to select a proper heating temperature or a heating atmosphere, in order to allow carbon in at least the organometallic compound or the additional organic material in the coating film to remain in the electrode active material layer as carbonic matter distinct from conductive materials.

In the heating step, any means of heating or heating device can be used, as long as it can heat the coating film at a desired heating temperature. Specifically, one of, or a combination of two or more of, such heating devices as a hot plate, an oven, a heating furnace, an infrared heater, a halogen heater and a hot air blower can be used. When the current collector is planar, it is preferable to use a hot plate or the like. When a hot plate is used for heating, it is preferred that the current collector coated with the coating film be heated with the coating film side not facing the heating surface of the hot place.

For the heating step, a temperature that is equal to or more than the temperature at which the binding-material-forming material begins to decompose thermally, that is less than the crystallization temperature of the metal oxide that is formed in the heating step, and at which carbon contained in at least one of the organometallic compound and the additional organic material can remain in the electrode active material layer as carbonic matter distinct from conductive materials, is selected as the heating temperature.

The temperature at which the binding-material-forming material begins to decompose thermally varies depending on the type of the compound used as the binding-material-forming material.

When the metallic-element-containing compound or the organometallic compound contained in the coating film is heated and thermally decomposed, it is usually oxidized to a metal oxide rapidly. Whether a metal oxide has been formed or not can be judged by a preliminary experiment that is carried out in the following manner: a solution containing the metallic-element-containing compound or the organometallic compound is applied to a substrate, and then heated, thereby forming a film on the substrate; a sample is obtained by scraping the film off the substrate and is subjected to a composition analysis, thereby determining the metallic element content and the oxygen content If the result of the composition analysis shows that a metal oxide has been formed, it can be said that the metallic-element-containing compound or the organometallic compound has been heated on the substrate at a temperature equal to or more than the temperature at which the compound begins to decompose thermally. Heating in the above preliminary experiment is conducted in the same heating atmosphere as the one that is supposed to be used in this production method. It can thus be understood that "the temperature at which a metallic-element-containing compound begins to decompose thermally" or "the temperature at which an organometallic compound begins to decompose thermally" is the temperature at which the metallic-element-containing compound or the organometallic compound is thermally decomposed when heated, and oxidation of the metallic element contained in the metallic-element-containing or organometallic compound begins.

In the present invention, the "crystallization temperature" refers to the temperature at which, after a metal atom present in the electrode active material layer-forming composition has been oxidized to a metal oxide, the metal oxide crystallizes. The metal oxide crystallizes at its crystallization temperature, and the degree of crystallinity increases as the temperature exceeds the crystalline temperature. In the present invention, however, "crystallization" means that a peak representing the crystalline state is observed on an X-ray diffraction pattern, irrespective of the degree of crystallinity.

The "crystallization temperature" of a metal oxide in the present invention does not always agree with the inherent crystallization temperature of the metal oxide, and is sometimes slightly different from the inherent crystallization temperature depending on the state of the metal oxide in the electrode active material layer-forming composition. In consideration of this point, it is desirable to check beforehand the crystallization temperature of the metal oxide in a coating film that will become an electrode active material layer.

On the other hand, when the heating temperature is "less than the crystallization temperature" of the metal oxide to be formed in the heating step, the metal oxide can remain amorphous in the electrode active material layer formed on a current collector. Whether a film of a metal oxide has been heated at a temperature less than the crystallization temperature of the metal oxide can be judged by carrying out a preliminary experiment in the following manner. A solution containing the binding-material-forming material is applied to a substrate, and then heated at a temperature equal to or more than the temperature at which the binding-material-forming material begins to decompose thermally, thereby forming a metal oxide film on the substrate. A sample is obtained by scraping the film off the substrate, and its crystallinity is evaluated by X-ray diffractometry using an X-ray diffractometer. If no peak representing the crystalline state is observed on the X-ray diffraction pattern of the sample, it can be understood that the film has been heated at a temperature less than the crystallization temperature of the metal oxide.

Further, the temperature at which carbon contained in the organometallic compound or in the organic material can remain in the electrode active material layer as carbonic matter distinct from conductive materials is specifically as follows, for example. In the case where an organometallic compound is used as the material for forming carbonic matter that is distinct from conductive materials and that will remain in the electrode active material layer, the above temperature may be one at which the organometallic compound releases its organic group, and at least a part of the organic group is not eliminated but carbonated in the heating step and can remain in the electrode active material as carbonic matter distinct from conductive materials.

Also in the case where an organic material is used as the material for forming carbonic matter, the above temperature may be one at which at least a part of an organic group in the organic material is not eliminated but carbonated and can remain in the electrode active material layer.

More specifically, when an electrode active material layer for an electrode plate of this embodiment is formed with the use of an electrode active material layer-forming composition containing at least a particulate electrode active material, a metallic-element-containing compound and an organic material, the heating temperature in the heating step can be set to a temperature that is equal to or more than the temperature at which the metallic-element-containing compound begins to decompose thermally, that is less than the crystallization temperature of the metal oxide that is formed in the heating step, and at which carbon originating from the organic material can remain in the electrode active material layer as carbonic matter distinct from conductive materials.

When an electrode active material layer for an electrode plate of this embodiment is formed with the use of an electrode active material layer-forming composition containing at least a particulate electrode active material and an organometallic compound, the heating temperature in the heating step can be set to a temperature that is equal to or more than the temperature at which the organometallic compound begins to decompose thermally, that is less than the crystallization temperature of the metal oxide that is formed in the heating step, and at which carbon originating from the organometallic compound can remain in the electrode active material layer as carbonic matter distinct from conductive materials.

When an electrode active material layer for an electrode plate of this embodiment is formed with the use of an electrode active material layer-forming composition containing at least a particulate electrode active material, an organometallic compound and an organic material, the heating temperature in the heating step can be set to a temperature that is equal to or more than the temperature at which the organometallic compound begins to decompose thermally, that is equal to or more than the crystallization temperature of the metal oxide that is formed in the heating step, and at which carbon originating from the organometallic compound and/or the organic material can remain in the electrode active material layer as carbonic matter distinct from conductive materials.

A suitable heating temperature varies depending on the binding-material-forming material used, or on the combination of the ingredients such as an organic material of the electrode active material layer-forming composition. It is therefore desirable to select a heating temperature beforehand so that the desired substances can remain in the electrode active material layer.

When making the selection of a heating temperature for the heating step, it is desirable to take the heat resistance of the current collector, the heat resistance of the particulate electrode active material, and the heat resistance of the conductive material into due consideration. For example, the heat resistance of copper foil, which is usually used as a current collector for an anode plate, is around 200° C. since it undergoes oxidation in an atmosphere of air, and around 1080° C. in an atmosphere of an inert gas. The heat resistance of aluminum foil is around 660° C. If the heating temperature is in excess of the temperature to which the current collector can withstand, the current collector may be damaged.

The heating step may be performed in any atmosphere, and the selection of an atmosphere may be made in consideration of the materials that are used for producing an electrode plate, the heating temperature, the oxygen potential of the metallic element, and so forth.

For example, when the heating step is performed in an atmosphere of air, it is not necessary to control the atmosphere specially, and the heating step can thus be conducted with ease. From this point of view, the use of an atmosphere of air is preferred. In the case where aluminum foil is used as a current collector, the heating step can be performed successfully in an atmosphere of air because there is no possibility that aluminum foil undergoes oxidation in an atmosphere of air even when heated.

On the other hand, when copper foil is used as a current collector, the use of an atmosphere of air is not desirable since copper foil is oxidized in the heating step if the heating step is conducted in an atmosphere of air. In this case, it is preferable to conduct the heating step in an atmosphere of an inert gas, of a reducing gas, or of a gas mixture of an inert gas and a reducing gas. It should be noted that when the heating step is performed, for forming a metal oxide in the electrode active material layer, in an atmosphere with an insufficient oxygen gas content, the metallic element in the metallic-element-containing compound or in the organic material has to combine with oxygen contained in the compounds in the electrode active material layer-forming composition to cause oxidation. In this case, the use of compounds containing element oxygen is required.

The aforementioned production method can be performed in any known atmosphere, and an atmosphere of an inert gas, an atmosphere of a reducing gas, an atmosphere of a gas mixture of an inert gas and a reducing gas, or the like can be used. For example, the production method can be performed in an atmosphere of such an inert gas as argon or nitrogen gas, or in an atmosphere of such a reducing gas as hydrogen or carbon monoxide gas.

Employing the aforementioned method for producing an electrode plate for a non-aqueous electrolyte secondary battery according to this embodiment, an electrode plate for a non-aqueous electrolyte secondary battery that is improved in output and input characteristics as compared with a conventional electrode plate can be easily produced with the use of readily available general-purpose materials.

Moreover, an electrode active material layer-forming composition containing at least a metallic-element-containing compound, a particulate electrode active material and an organic material, or an electrode active material layer-forming composition containing at least an organometallic compound as the binding-material-forming material and a particulate electrode active material can have such viscosity that the composition can be applied to a current collector while showing good coating properties, irrespective of the particle diameter of the particulate electrode active material. For this reason, it became possible to use a particulate electrode active material with a small particle diameter, whose use in a conventional electrode active material layer-forming composition using a resin binder had been difficult because a particulate electrode active material with a small particle diameter makes the viscosity of the composition considerably high. Moreover, since the electrode active material layer-forming composition shows good coating properties when it is applied to a current collector, it is possible to form an electrode active material layer with a desired thickness on a current collector.

[Non-Aqueous Electrolyte Secondary Battery]

A non-aqueous electrolyte secondary battery 10 usually comprises an anode 14 with an anode plate 15, a cathode 16 with a cathode plate 17, and a separator 13 placed between the anode plate 15 and the cathode plate 17, as shown in FIG. 9A. The anode 14, the anode plate 15, the cathode 16, the cathode plate 17, and the separator 13 are contained within a container 11. The separator 13 is made of a polyethylene porous film. The container 11 is sealed with its inside filled with a non-aqueous electrolyte 19.

(Electrode Plate)

A non-aqueous electrolyte secondary battery of the present invention uses an electrode plate of this embodiment described above as the cathode plate and/or the anode plate. The electrode plate of this embodiment is extremely excellent in output and input characteristics, as mentioned above. A non-aqueous electrolyte secondary battery of this embodiment, using the electrode plate of this embodiment, therefore is to exhibit improved output and input characteristics as well.

In the non-aqueous electrolyte secondary battery, when an electrode plate of this embodiment is used only for the cathode plate, a conventional anode plate for a non-aqueous electrolyte secondary battery can be used for the anode plate. A conventional anode plate that can be used herein is one obtained by applying an anode active material layer-forming composition to at least a part of the surface of a current collector made of e.g., copper foil, such as electrolytic or rolled copper foil, with a thickness of about 5 to 50 µm, and drying the applied composition, followed by pressing, if necessary. The anode active material layer-forming composition usually contains a particulate anode active material such as an active material made of natural graphite, synthetic graphite, amorphous carbon, carbon black, or a carbonaceous material obtained by adding other elements to the above material, or a material capable of occluding and releasing lithium ion, such as metallic lithium, a lithium alloy, tin, silicon, a tin alloy, or a silicon alloy; and a resin binder; and, if necessary, additives such as a conductive material. It is however possible to use other anode active material layer-forming compositions.

In the non-aqueous electrolyte secondary battery, when an electrode plate of this embodiment is used only for the anode plate, a known cathode plate for a non-aqueous electrolyte secondary battery can be used for the cathode plate. A conventional cathode plate that can be used herein is one obtained by applying a cathode active material layer-forming composition to at least a part of the surface of a current collector made of e.g., aluminum foil with a thickness of about 5 to 50 µm, and drying the applied composition, followed by pressing, if necessary. The cathode active material layer-forming composition usually contains a particulate cathode active material such as a lithium-transition combined metal oxide, e.g., $LiCoO_2$, $LiMn_2O_4$, $LiNiO_2$, $LiFeO_2$, $Li_4Ti_5O_{12}$ or $LiFePO_4$, and a resin binder, and if necessary, additives such as a conductive material. It is however possible to use other cathode active material layer-forming compositions.

(Non-Aqueous Electrolyte)

Although any non-aqueous electrolyte that is usually used for a non-aqueous electrolyte secondary battery can be used herein, it is preferable to use a non-aqueous electrolyte prepared by dissolving a lithium salt in an organic solvent.

Typical examples of the lithium salt include inorganic lithium salts such as $LiClO_4$, $LiBF_4$, $LiPF_6$, $LiAsF_6$, LiCl and LiBr; and organic lithium salts such as $LiB(C_6H_5)_4$, $LiN(SO_2CF_3)_2$, $LiC(SO_2CF_3)_3$, $LiOSO_2CF_3$, $LiOSO_2C_2F_5$, $LiOSO_2C_4F_9$, $LiOSO_2C_5F_{11}$, $LiOSO_2C_6F_{13}$ and $LiOSO_2C_7F_{15}$.

Examples of the organic solvent useful for dissolving a lithium salt include cyclic esters, chain esters, cyclic ethers, and chain ethers.

Specific examples of the cyclic esters include propylene carbonate, butylene carbonate, γ-butyrolactone, vinylene carbonate, 2-methyl-γ-butyrolactone, acetyl-γ-butyrolactone, and γ-valerolactone.

Specific examples of the chain esters include dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl propionates, dialkyl malonates, and alkyl acetates.

Specific examples of the cyclic ethers include tetrahydrofuran, alkyltetrahydrofurans, dialkyltetrahydrofurans, alkoxytetrahydrofurans, dialkoxytetrahydrofurans, 1,3-dioxolane, alkyl-1,3-dioxolanes, and 1,4-dioxolane.

Specific examples of the chain ethers include 1,2-dimethoxyethane, 1,2-diethoxythane, diethyl ether, ethylene glycol dialkyl ethers, diethylene glycol dialkyl ethers, triethylene glycol dialkyl ethers, and tetraethylene glycol dialkyl ethers.

A suitable structure selected from conventional ones may be used as the structure of the battery (cell) that is produced with the use of the above-described cathode plate, anode plate, separator, and non-aqueous electrolyte. For example, the following structure can be adopted: a cathode plate and an anode plate are spirally wound up with a separator made of a polyethylene porous film or the like between the two electrode plates, and this one is placed in a battery (cell) container. Another possible embodiment is as follows: a cathode plate and an anode plate that have been cut into a desired shape are layered over each other with a separator between the two electrode plates and are bound together, and this one is placed in a battery (cell) container. In either structure, after placing the cathode plate and the anode plate in the battery (cell) container, lead wire attached to the cathode plate is connected to a cathode terminal provided on an outer container. On the other hand, lead wire attached to the anode plate is connected to an anode terminal provided in the outer container. The battery container is filled with a non-aqueous electrolyte and sealed, whereby a non-aqueous electrolyte secondary battery is produced.

A non-aqueous electrolyte secondary battery according to this embodiment uses as the cathode plate and/or the anode plate an electrode plate of this embodiment that is improved in output and input characteristics, as mentioned above. The non-aqueous electrolyte secondary battery is therefore to have improved output and input characteristics.

EXAMPLES

Example 1

A starting solution for forming a metal oxide that does not cause lithium ion intercalation and deintercalation reactions was prepared by adding 10.0 g of $Fe(NO_3)_3.9H_2O$ [molecular weight: 404] as the metallic-element-containing compound, to 20 g of ethanol and blending this mixture with 10 g of polyethylene glycol 200 (manufactured by Kanto Chemical Co., Ltd., Japan). Subsequently, to the starting solution were added 10 g of $LiMn_2O_4$ with a mean particle diameter of 4 µm as the cathode active material, 1.5 g of acetylene black ("Denka Black" manufactured by Denki Kagaku Kogyo K.K., Japan) as the conductive material, and 0.1 g of carbon fiber ("VGCF" manufactured by Showa Denko K.K., Japan), and the mixture was kneaded with a homogenizer ("Excel Autohomogenizer" manufactured by NIHON SEIKI KAISHA, Japan) at 7000 rpm for 40 minutes, whereby an electrode active material layer-forming composition was obtained. The ingredients of the electrode active material layer-forming composition are shown in Table 1. The ingredients of the electrode active material layer-forming compositions that were prepared in the following Examples 2 to 20 and Comparative Examples 1 to 4 are shown in the table as well.

Aluminum foil with a thickness of 15 µm was prepared as a current collector. The electrode active material layer-forming composition was applied to one surface of the current collector with an applicator in such an amount that the weight of the electrode active material layer to be finally formed would be 15 g/m$^2$, thereby forming an electrode active material layer-forming coating film.

Next, the current collector having thereon the electrode active material layer-forming coating film was placed in an electric oven (muffle furnace, "P90" manufactured by Denken Co., Ltd., Japan) at normal temperatures and was heated to a temperature of 260° C. over a period of 1 hour, and heating was continued for a further 5 hours while maintaining the temperature. In this manner, there was obtained a cathode plate for a non-aqueous electrolyte secondary battery of the aforementioned embodiment, having on the current collector an electrode active material layer suitable as a cathode active material layer. The cathode plate was left as it is until it cooled to room temperature. After this, the cathode plate was cut into a piece in a predetermined size (in the shape of a disk with a diameter of 15 mm), whereby a cathode plate of Example 1 was obtained. The thickness of the electrode active material layer was measured with a micrometer at 10 points that were selected randomly. The average value of the ten measurements, obtained by calculation, was 24 µm.

Evaluation of Film-Forming Properties:

In the production of the cathode plate of Example 1, a disk in the desired size was cut out of the cathode plate for a non-aqueous electrolyte secondary battery. In this operation, it was possible to obtain the working electrode without suffering any trouble, such as separation of the electrode active material layer. This means that the electrode active material layer is good in film-forming properties. In the following description of Examples and Comparative Examples, "good in film-forming properties" means that it was possible to cut a disk out of the cathode plate (or the anode plate) without experiencing any trouble. On the other hand, when it was impossible to cut a disk suitable for use as the working electrode of a three-electrode coin cell out of the cathode plate (or the anode plate) since the electrode active material layer partially peeled off or fully fell from the current collector, the electrode active material layer is rated as poor in film-forming properties.

Figure 5:
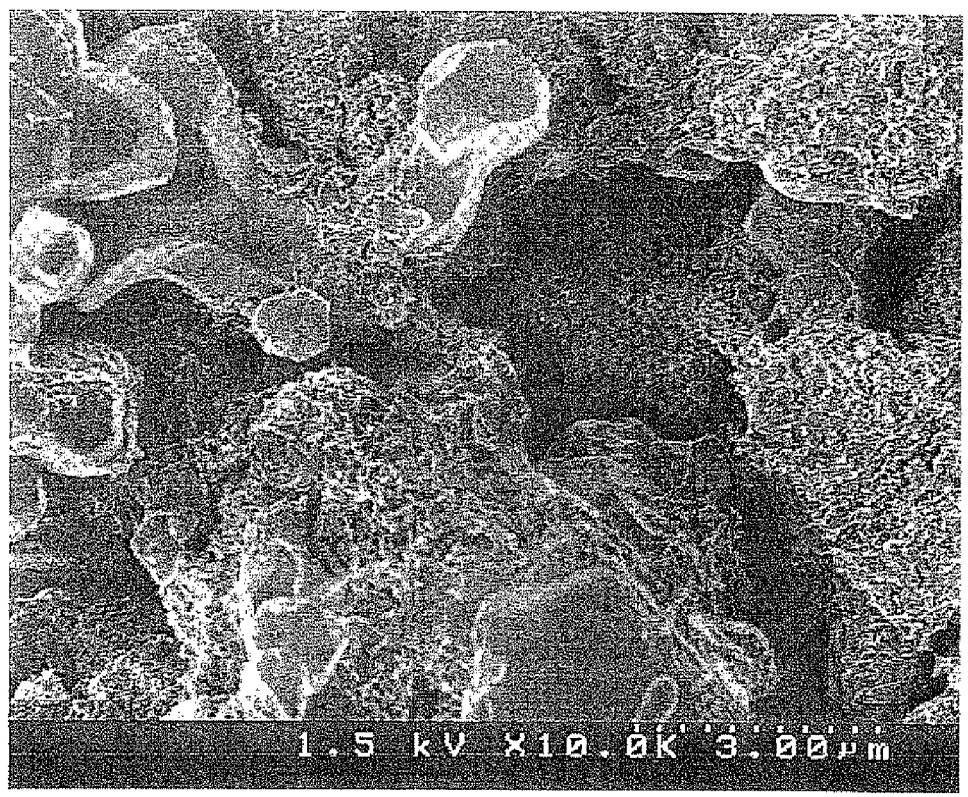
FIG. 5 is an electron micrograph, taken with a scanning electron microscope (SEM) at a magnification of ×10,000, of a section of Example 1 taken vertically to its current collector.

The film on the current collector in the cathode plate of Example 1 was observed with a scanning electron microscope (SEM) at a magnification of ×10,000. It was confirmed that the particulate cathode active material was fixed to the current collector to form a satisfactory film, as shown in FIG. 5.

Composition Analysis:

Scraping the electrode active material layer in the cathode plate of Example 1, Sample 1 was obtained. The composition analysis of Sample 1 was carried out by X-ray electron spectroscopy for chemical analysis. The result was as follows: 9 atomic % element iron, 5 atomic % element manganese, 53 atomic % element oxygen, and 33 atomic % element carbon. Element nitrogen was not detected. The result shows that iron nitrate that had been contained in the electrode active material layer-forming coating film was thermally decomposed into iron oxide.

(Confirmation Test 1)

A cathode plate for a non-aqueous electrolyte secondary battery was produced in the same manner as in Example 1, except that the acetylene black and the carbon fiber used in Example 1 were not used. The composition analysis of the electrode active material layer in this cathode plate was carried out in the above-described manner; the content of element carbon was 13 atomic %. It was thus confirmed that the electrode active material layer in the cathode plate of Example 1 contained carbonic matter originating from the acetylene black and the carbon fiber, as well as carbonic matter other than the carbonic matter originating from these conductive materials.

Figure 6:
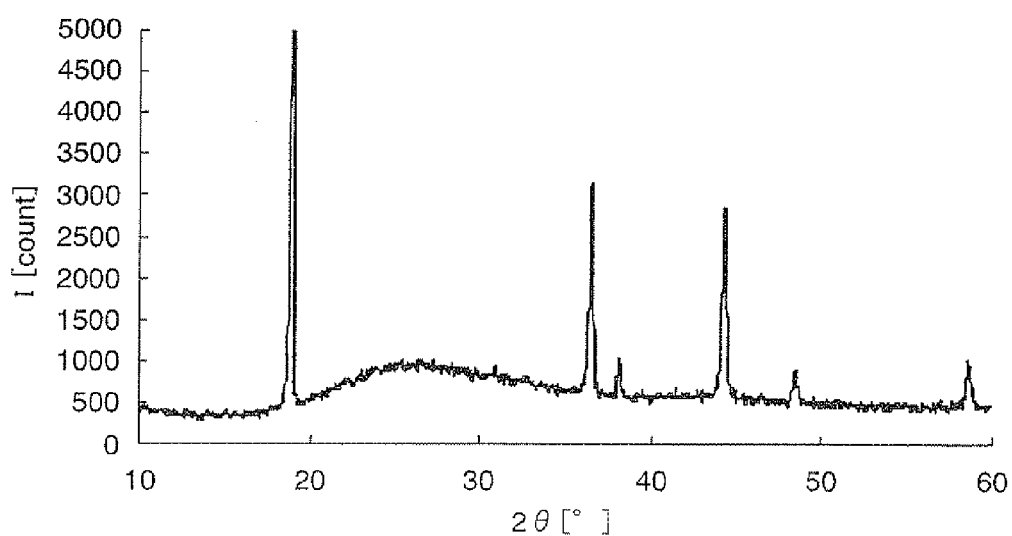
FIG. 6 is a chart showing the X-ray diffraction pattern of the electrode active material layer in the cathode plate of Example 1.
Figure 7:
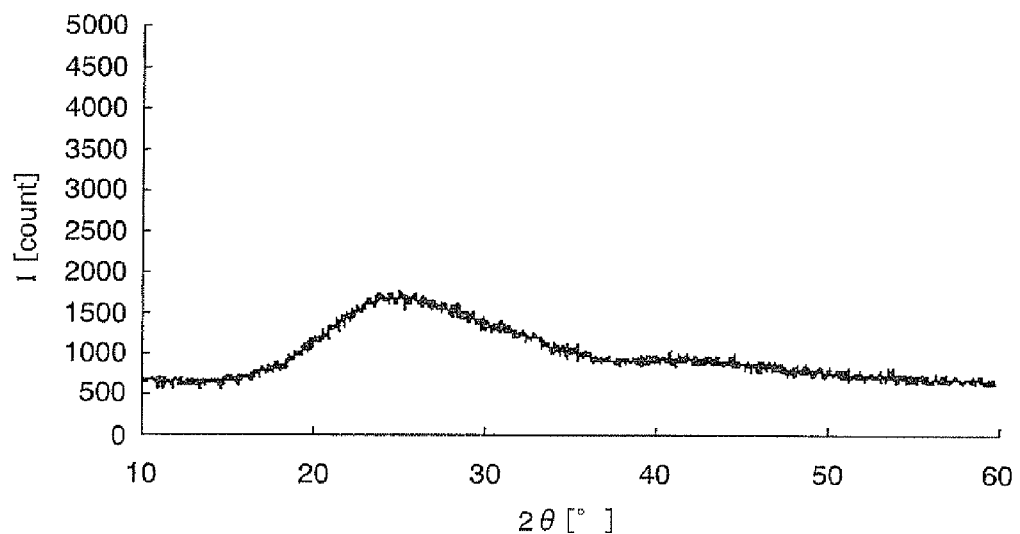
FIG. 7 is a chart showing the X-ray diffraction pattern of iron oxide formed by heating under the same conditions as in the production of Example 1.
Figure 8:
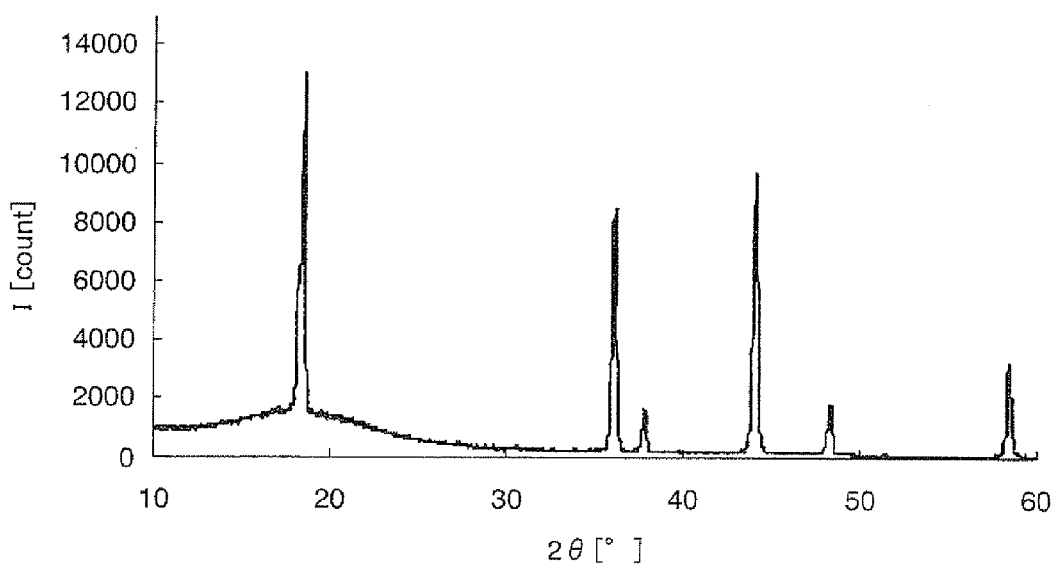
FIG. 8 is a chart showing the X-ray diffraction pattern of lithium manganate, particulate cathode active material.

Evaluation of Crystallinity:

The crystallinity of Sample 1 was evaluated by X-ray diffractometry (XRD) using an X-ray diffractometer. As FIG. 6 shows, it was found that the metal oxide present in the electrode active material layer was amorphous. For reference, the result obtained from the evaluation of crystallinity that was made in the following manner is shown in FIG. 7. A starting solution for forming the above metal oxide (a solution to which the cathode active material is not added yet) was applied to a glass plate with a Meyer bar No. 4 and was heated under the same conditions as in the production of the electrode plate. A sample was obtained by scraping the film formed on the glass plate, and its crystallinity was evaluated by X-ray diffractometry. Separately, the crystallinity of "M1090" used as the particulate cathode active material was evaluated by X-ray diffractometry; the result is shown in FIG. 8. FIG. 7 shows the X-ray diffraction pattern of iron oxide that was formed when the starting solution was heated. Peaks were not observed on this diffraction pattern; this shows that the iron oxide is amorphous. FIG. 8 shows the X-ray diffraction pattern of lithium manganate, particulate cathode active material. The peaks representing crystalline lithium manganate were observed on this diffraction pattern. The X-ray diffraction pattern shown in FIG. 6 was examined with reference to the diffraction patterns shown in FIGS. 7 and 8. Only the characteristic peaks representing crystalline lithium manganite were observed on the diffraction pattern shown in FIG. 6, and it was confirmed that the broad continuum representing amorphous iron oxide overlapped with the peaks representing crystalline lithium manganite.

Figure 3:
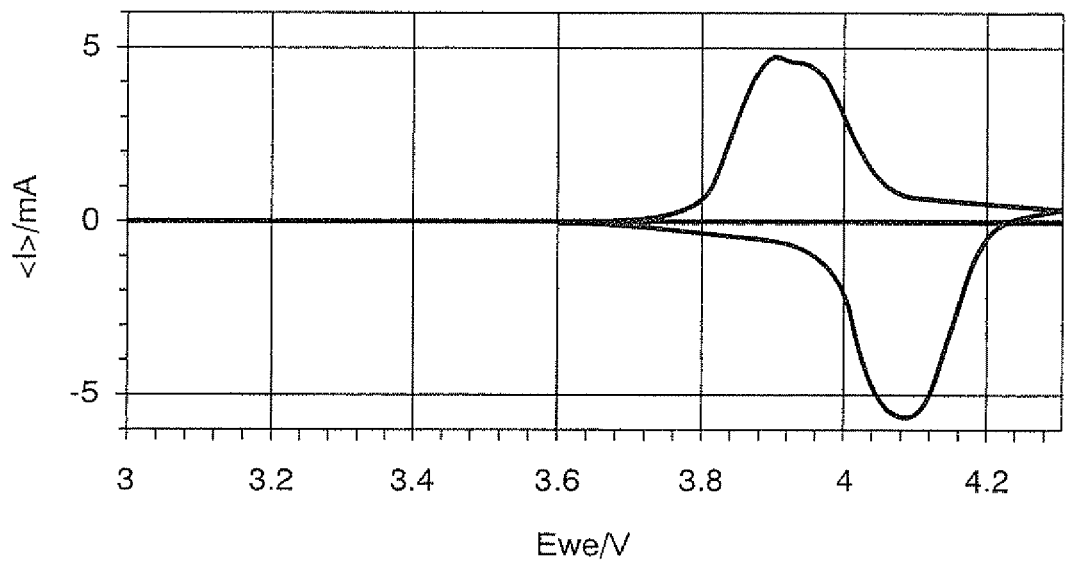
FIG. 3 is a cyclic voltammogram obtained from a cyclic voltammetry test made on a metal oxide that causes lithium ion intercalation and deintercalation reactions.

Cyclic Voltammetry Test (CV Test):

The cathode plate of Example 1 was subjected to a CV test. Specifically, the operation of sweeping the electrode potential from 3.0 V to 4.3 V and then returning the electrode potential to 3.0 V was repeated three times. The scanning rate was made 1 mV/sec. The cyclic voltammogram shown in FIG. 3 corresponds to the result of the second cycle. As is clear from FIG. 3, a peak representing oxidation that is equivalent to lithium deintercalation reaction of $LiMn_2O_4$ was observed at around 3.9 V, and a peak representing reduction that is equivalent to lithium intercalation reaction of $LiMn_2O_4$, at around 4.1 V. On the other hand, a laminate obtained by applying a starting solution for forming the above metal oxide (a solution to which the cathode active material is not added yet) to an aluminum substrate with a Meyer bar No. 4, and heating the applied solution under the same conditions as in the production of the electrode plate was subjected to the same CV test as is described above. The cyclic voltammogram shown in FIG. 4 corresponds to the result of the second cycle. As is clear from FIG. 4, no electrochemical reaction took place in the film formed on the substrate. It was thus confirmed that the iron oxide serving as a binding material in the cathode plate of Example 1 does not cause lithium intercalation and deintercalation reactions. In this example, a VMP3 manufactured by Bio Logic Corp. was used for the CV test. The amount of the electrode active material layer-forming composition applied to the current collector, the thickness and film-forming properties of the electrode active material layer formed on the current collector, the binding material formed in the electrode active material layer, the crystallinity of the binding material, and the results of the CV tests described in this paragraph are collectively shown in Table 2. As to the cathode plates of the following Examples 2 to 20 and Comparative Examples 1 to 4, the values of these items are shown in the table as well.

<Assemblage of Three-Electrode Coin Cell>

A non-aqueous electrolyte was prepared by adding lithium phosphate hexafluoride ($LiPF_6$) as the solute to a solvent mixture of ethylene carbonate (EC)/dimethyl carbonate (DMC) (=1:1 by volume), and adjusting the lithium phosphate hexafluoride concentration to 1 mol/L.

Using the cathode plate of Example 1 (in the shape of a disk with a diameter of 15 mm, weight of the cathode active material in the disk: 2.72 mg/1.77 $cm^2$) as the working electrode, metallic lithium plates as the opposite electrode and the reference electrode, and the above-prepared non-aqueous electrolyte as the electrolyte, a three-electrode coin cell was assembled, whereby a test cell of Example 1 (Test Cell 1) was obtained. This test cell was subjected to the following charge and discharge tests.

Charge and Discharge Tests:

Test Cell 1, the three-electrode coin cell assembled in the above-described manner, was fully charged in accordance with the procedure described under the following "Charge Test", before carrying out a discharge test on the working electrode.

(Charge Test)

Test Cell 1 was charged at a constant current (245 μA) in an environment at 25° C., until the voltage reached 4.3 V. After the voltage had reached 4.3 V, the current (discharge rate: 1 C) was reduced to below 5% with the voltage kept below 4.3V, and constant-voltage charging was conducted until the test cell was fully charged. After this, the test cell was rested for 10 minutes. The above "1 C" is the current value at which the three-electrode coin cell discharges completely (the final discharge voltage is attained) in one hour when it is discharged at a constant current. The above constant current was set so that 90 mAh/g, the theoretical discharge capacity of lithium manganate, active material, on the working electrode of Test Cell 1, would be discharged in 1 hour.

(Discharge Test)

Test Cell 1 that had been fully charged was discharged at a constant current (245 µA) (discharge rate: 1 C) in an environment at 25° C. until the voltage decreased from 4.3 V (full charge voltage) to 3.0 V (final discharge voltage). Plotting cell voltage (V) as the ordinate and discharge time (h) as the abscissa, a discharge curve was drawn. Using this curve, the discharge capacity value (mAh) of the working electrode (the cathode plate of Example 1) was obtained; it was converted into the value of the discharge capacity per unit weight of the active material layer of the working electrode (mAh/g).

Subsequently, on the basis of the constant-current discharge test carried out in the above-described manner at a constant current of 245 µA (discharge rate: 1 C, discharge completion time: 1 hour), constant-current discharge tests were carried out at a constant current of 12.2 mA, 50 times the above current (discharge rate: 50 C, discharge completion time: 1.2 minutes), and at a constant current of 24.5 mA, 100 times the above current (discharge rate: 100 C, discharge completion time: 0.6 minutes). The discharge capacity values (mAh) of the working electrode at the respective discharge rates were obtained; they were converted into the values of discharge capacity per unit weight (mAh/g). The results are collectively shown in Table 3. Using the cathode plates of the following Examples 2 to 20 and Comparative Examples 1 to 4, Test Cells 2 to 20 and Comparative Test Cells 1 to 4 were assembled, respectively, in the above-described manner. These test cells were subjected to the same charge and discharge tests as are described above. The results are shown in Table 3 or 4 as well.

(Calculation of Percentages of Discharge Capacity Retention)

In order to evaluate the discharge rate characteristics of the working electrode, the percentages of discharge capacity retention were obtained by using the above Equation 1 and the above values of discharge capacity per unit weight (mAh/g) obtained at the respective discharge rates. The percentages of discharge capacity retention of Test Cell 1, obtained by calculation were 96% at 100 C, and 99% at 50 C. The results are shown in Table 3. The percentages of discharge capacity retention of Test Cells 2 to 20 and of Comparative Test Cells 1 to 4 are shown in Table 3 or 4 as well.

In the column "evaluation of output characteristics" in Tables 3 and 4 are shown the discharge rate characteristics of the electrodes rated in accordance with the following criteria.

The percentage of discharge capacity retention at a discharge rate of 50 C is 60% or more: ⊚
The percentage of discharge capacity retention at a discharge rate of 50 C is 50% or more and less than 60%: ○
The percentage of discharge capacity retention at a discharge rate of 50 C is 30% or more and less than 50%: Δ
The percentage of discharge capacity retention at a discharge rate of 50C is less than 30%: X EXAMPLES 2 to 20

Example 2

A cathode plate of Example 2 was obtained in the same manner as in Example 1, except that 0.4 g of $Fe(NO_3)_3 \cdot 9H_2O$ [molecular weight: 404] as the metallic-element-containing compound was added to 5 g of methanol (this mixture was blended with 10 g of polyethylene glycol 200 (manufactured by Kanto Chemical Co., Ltd., Japan as in Example 1), and that the electrode active material layer-forming composition was applied to the current collector in the amount shown in Table 2.

Example 3

A cathode plate of Example 3 was obtained in the same manner as in Example 1, except that $LiMn_2O_4$ with a mean particle diameter of 0.3 µm was used as the cathode active material, and that the electrode active material layer-forming composition was applied to the current collector in the amount shown in Table 2.

Example 4

A cathode plate of Example 4 was obtained in the same manner as in Example 1, except that $LiMn_2O_4$ with a mean particle diameter of 10 µm was used as the cathode active material, and that the electrode active material layer-forming composition was applied to the current collector in the amount shown in Table 2.

Example 5

An cathode plate of Example 5 was obtained in the same manner as in Example 1, except that 2.0 g of $Fe(NO_3)_3 \cdot 9H_2O$ [molecular weight: 404] as the metallic-element-containing compound and 23.0 g of titanium diisopropoxy bisacetylacetonate [molecular weight: 363.88] ("TC-100" available from Matsumoto Trading Co., Ltd., Japan) as the organometallic compound were added to 35 g of methanol, that the mixture was blended with 5 g of ethyl cellulose ("Etocel Gr. STD-100" available from Nisshin & Co., Ltd., Japan), that $LiMn_2O_4$ with a mean particle diameter of 1 µm was used as the cathode active material, and that the electrode active material layer-forming composition was applied to the current collector in the amount shown in Table 2.

Example 6

A cathode plate of Example 6, for a non-aqueous electrolyte secondary battery, was obtained in the same manner as in Example 1, except that 4.0 g of $Li(CH_3COO) \cdot 2H_2O$ [molecular weight: 102] as the organometallic compound was added to 16 g of methanol, that the mixture was blended with 10 g of ethyl cellulose ("Etocel Gr. STD-7" available from Nisshin & Co., Ltd., Japan), that $LiMn_2O_4$ with a mean particle diameter of 1 µm was used as the cathode active material, that the electrode active material layer-forming composition was applied to the current collector in the amount shown in Table 2, and that the heating conditions used for heating the current collector having thereon the electrode active material layer-forming coating film in Example 1 were changed to the following. The current collector having on its surface the electrode active material layer-forming coating film was placed in an electric furnace at normal temperatures and was heated to a temperature of 260° C. over a period of 1 hour. Heating was continued for a further 5 hours while maintaining the temperature at 260° C. Subsequently, the current collector with the coating film was heated to 420° C. over a period of 15 minutes, and heating was continued for a further 5 minutes while maintaining the temperature at 420° C.

Example 7

A cathode plate of Example 7, for a non-aqueous electrolyte secondary battery, was obtained in the same manner as in Example 1, except that 12 g of Ni(CH$_3$COCHCOCH$_3$)$_2$.2H$_2$O [molecular weight: 293] as the organometallic compound was added to 16 g of methanol, that LiMn$_2$O$_4$ with a mean particle diameter of 1 μm was used as the cathode active material, that no organic material was used, and that the electrode active material layer-forming composition was applied to the current collector in the amount shown in Table 2.

Example 8

A cathode plate of Example 8 was obtained in the same manner as in Example 1, except that 4.0 g of Mg(NO$_3$)$_2$.6H$_2$O [molecular weight: 256] as the metallic-element-containing compound was added to 13 g of water and 3 g of methanol, that the mixture was blended with 5 g of starch (soluble) manufactured by Kanto Chemical Co., Inc., Japan, that LiMn$_2$O$_4$ with a mean particle diameter of 1 μm was used as the cathode active material, and that the electrode active material layer-forming composition was applied to the current collector in the amount shown in Table 2.

Example 9

A cathode plate of Example 9 was obtained in the same manner as in Example 1, except that 6.0 g of Cu(NO$_3$)$_2$.3H$_2$O [molecular weight: 241] as the metallic-element-containing compound was added to 10 g of methanol and 5 g of acetone, that the mixture was blended with 5 g of cellulose acetate manufactured by Kanto Chemical Co., Inc., Japan, that LiMn$_2$O$_4$ with a mean particle diameter of 1 μm was used as the cathode active material, and that the electrode active material layer-forming composition was applied to the current collector in the amount shown in Table 2.

Example 10

A cathode plate of Example 10 was obtained in the same manner as in Example 1, except that 7.0 g of Ca(NO$_3$)$_2$.4H$_2$O [molecular weight: 236] as the metallic-element-containing compound was added to 15 g of methanol, that the mixture was blended with 10 g of releasing varnish ("46-7-0" manufactured by Showa Ink Kogyo K.K., Japan), that LiMn$_2$O$_4$ with a mean particle diameter of 1 μm was used as the cathode active material, and that the electrode active material layer-forming composition was applied to the current collector in the amount shown in Table 2.

Example 11

A cathode plate of Example 10 was obtained in the same manner as in Example 1, except that 5.0 g of Cr(NO$_3$)$_3$.9H$_2$O [molecular weight: 400] as the metallic-element-containing compound and 5.0 g of titanium diisopropoxy bisacetylacetonate [molecular weight: 363.88] ("TC-100" available from Matsumoto Trading Co., Ltd., Japan) as the organometallic compound were added to 15 g of methanol, that the mixture was blended with 7 g of a heat-sensitive adhesive ("TS-PC Varnish A" manufactured by Dai-Nippon Ink & Chemical, Inc., Japan), that LiMn$_2$O$_4$ with a mean particle diameter of 1 μm was used as the cathode active material, and that the electrode active material layer-forming composition was applied to the current collector in the amount shown in Table 2.

Example 12

A cathode plate of Example 11 was obtained in the same manner as in Example 1, except that 9.0 g of (CH$_3$COCH:C(CH$_3$)O)$_2$Co [molecular weight: 257] as the organometallic compound was added to 15 g of methanol and 10 g of toluene, that the mixture was mixed with 10 g of phenol resin ("Sumilight Resin" manufactured by Sumitomo Bakelite Co., Ltd., Japan), that LiMn$_2$O$_4$ with a mean particle diameter of 1 μm was used as the cathode active material, and that the electrode active material layer-forming composition was applied to the current collector in the amount shown in Table 2.

Example 13

A cathode plate of Example 12 was obtained in the same manner as in Example 1, except that 9.0 g of Mn(NO$_3$)$_2$.6H$_2$O [molecular weight: 287] as the metallic-element-containing compound was added to 10 g of methanol and 10 g of xylene, that the mixture was blended with 8 g of an acryl-modified resin ("KV-905" manufactured by Harima Chemicals, Inc., Japan), that LiMn$_2$O$_4$ with a mean particle diameter of 1 μm was used as the cathode active material, and that the electrode active material layer-forming composition was applied to the current collector in the amount shown in Table 2.

Example 14

A cathode plate of Example 13 was obtained in the same manner as in Example 1, except that 7.0 g of Zn(NO$_3$)$_2$.6H$_2$O [molecular weight: 298] as the metallic-element-containing compound was added to 20 g of methanol, that the mixture was blended with 5 g of epoxy resin ("EPICLON 840S" manufactured by DIC Corp.), that LiMn$_2$O$_4$ with a mean particle diameter of 1 μm was used as the cathode active material, and that the electrode active material layer-forming composition was applied to the current collector in the amount shown in Table 2.

Example 15

A cathode plate of Example 15 was obtained in the same manner as in Example 1, except that 11.0 g of Y(CH$_3$COCHCOCH$_3$)$_3$.2H$_2$O [molecular weight: 408] as the organometallic compound was added to 15 g of methanol, that the mixture was blended with 10 g of polyethylene glycol 200 (manufactured by Kanto Chemical Co., Ltd., Japan), that LiMn$_2$O$_4$ with a mean particle diameter of 1 μm was used as the cathode active material, and that the electrode active material layer-forming composition was applied to the current collector in the amount shown in Table 2.

Example 16

A cathode plate of Example 16 was obtained in the same manner as in Example 1, except that 6.0 g of Zr(CH$_3$COCHCOCH$_3$)$_4$ [molecular weight: 488] as the organometallic compound was added to 25 g of methanol, that the mixture was blended with 10 g of polyethylene glycol 200 (manufactured by Kanto Chemical Co., Ltd., Japan), that LiMn$_2$O$_4$ with a mean particle diameter of 1 μm was used as the cathode active material, and that the electrode active material layer-forming composition was applied to the current collector in the amount shown in Table 2.

Example 17

A cathode plate of Example 17 was obtained in the same manner as in Example 1, except that LiMn$_2$O$_4$ with a mean particle diameter of 0.3 μm was used as the cathode active material, and that the electrode active material layer-forming composition was applied to the current collector in the amount shown in Table 2.

Example 18

A cathode plate of Example 18 was obtained in the same manner as in Example 1, except that $LiMn_2O_4$ with a mean particle diameter of 1 μm was used as the cathode active material, and that the electrode active material layer-forming composition was applied to the current collector in the amount shown in Table 2.

Example 19

A cathode plate of Example 19 was obtained in the same manner as in Example 1, except that $LiMn_2O_4$ with a mean particle diameter of 1 μm was used as the cathode active material, and that the electrode active material layer-forming composition was applied to the current collector in the amount shown in Table 2.

Example 20

A cathode plate of Example 20 was obtained in the same manner as in Example 1, except that $LiMn_2O_4$ with a mean particle diameter of 1 μm was used as the cathode active material, and that the electrode active material layer-forming composition was applied to the current collector in the amount shown in Table 2.

Thickness of Electrode Active Material Layer:

The thicknesses of the electrode active material layers in the cathode plates of Examples 2 to 20 were measured in the same manner as described in Example 1. The mean thickness values were obtained by calculation; they are shown in Table 2.

Evaluation of Film-Forming Properties:

The film-forming properties of the electrode active material layers in the cathode plates of Examples 2 to 20 were evaluated in the same manner as described in Example 1. The results are shown in Table 2.

Composition Analysis:

In the same manner as in the preparation of Sample 1, Samples 2 to 20 were obtained from the electrode active material layers formed in Examples 2 to 20, respectively. These samples were subjected to composition analyses. The following are the results of the analyses.

The composition of Sample 2 was as follows: 10 atomic % element iron, 12 atomic % element manganese, 56 atomic % element oxygen, and 22 atomic % element carbon. Element nitrogen was not detected. The result shows that iron nitrate that had been contained in the electrode active material layer-forming coating film was thermally decomposed into iron oxide.

The composition of Sample 3 was as follows: 13 atomic % element iron, 10 atomic % element manganese, 56 atomic % element oxygen, and 21 atomic % element carbon. Element nitrogen was not detected. The result shows that iron nitrate that had been contained in the electrode active material layer-forming coating film was thermally decomposed into iron oxide.

The composition of Sample 4 was as follows: 14 atomic % element iron, 9 atomic % element manganese, 56 atomic % element oxygen, and 21 atomic % element carbon. Element nitrogen was not detected. The result shows that iron nitrate that had been contained in the electrode active material layer-forming coating film was thermally decomposed into iron oxide.

The composition of Sample 5 was as follows: 2 atomic % element iron, 12 atomic % element titanium, 8 atomic % element manganese, 56 atomic % element oxygen, and 22 atomic % element carbon. Element nitrogen and Element chlorine were not detected. The result shows that iron nitrate that had been contained in the electrode active material layer-forming coating film was thermally decomposed into iron oxide.

The composition of Sample 6 was as follows: 15 atomic % element manganese, 60 atomic % element oxygen, and 25 atomic % element carbon. Since lithium is not detectable by the system of this composition analysis, the content of element lithium could not be obtained. It is however known that lithium acetate readily undergoes thermal decomposition, and if lithium acetate were present in Sample 6, the content of element carbon would be higher than the above value. Taking these points into account, it is concluded that lithium acetate used as the metallic-element-containing compound was decomposed into lithium oxide in the heating step.

The composition of Sample 7 was as follows: 12 atomic % element nickel, 17 atomic % element manganese, 52 atomic % element oxygen, and 19 atomic % element carbon. Element nitrogen was not detected. The result shows that cerium nitrate that had been contained in the electrode active material layer-forming coating film was thermally decomposed into cerium oxide.

The composition of Sample 8 was as follows: 8 atomic % element magnesium, 18 atomic % element manganese, 52 atomic % element oxygen, and 22 atomic % element carbon. Element nitrogen was not detected. The result shows that magnesium nitrate that had been present in the electrode active material layer-forming coating film was thermally decomposed into magnesium oxide.

The composition of Sample 9 was as follows: 11 atomic % element copper, 15 atomic % element manganese, 50 atomic % element oxygen, and 24 atomic % element carbon. Element nitrogen was not detected. The result shows that aluminum nitrate that had been contained in the electrode active material layer-forming coating film was thermally decomposed into aluminum oxide.

The composition of Sample 10 was as follows: 6 atomic % element calcium, 15 atomic % element manganese, 56 atomic % element oxygen, and 26 atomic % element carbon. Element nitrogen was not detected. The result shows that calcium nitrate that had been contained in the electrode active material layer-forming coating film was thermally decomposed into calcium oxide.

The composition of Sample 11 was as follows: 5 atomic % element chromium, 4 atomic % element titanium, 16 atomic % element manganese, 51 atomic % element oxygen, and 24 atomic % element carbon. Element chlorine was not detected. The result shows that titanium chlorine that had been contained in the electrode active material layer-forming coating film was thermally decomposed into titanium oxide.

The composition of Sample 12 was as follows: 13 atomic % element cobalt, 16 atomic % element manganese, 54 atomic % element oxygen, and 17 atomic % element carbon. From the above content of element carbon, it was understood that most carbon in cobalt acetate was eliminated by heat. It was thus confirmed that cobalt acetate that had been contained in the electrode active material layer-forming coating film was thermally decomposed into cobalt oxide.

The composition of Sample 13 was as follows: 10 atomic % element manganese, 16 atomic % element manganese, 53 atomic % element oxygen, and 21 atomic % element carbon. From the above content of element carbon, it was understood that carbon in nickel acetate was eliminated by heat. It was thus confirmed that nickel acetate that had been contained in the electrode active material layer-forming coating film was thermally decomposed into nickel oxide.

The composition of Sample 14 was as follows: 12 atomic % element zinc, 16 atomic % element manganese, 47 atomic % element oxygen, and 25 atomic % element carbon. Element nitrogen was not detected. It was thus confirmed that zinc nitrate that had been contained in the electrode active material layer-forming coating film was thermally decomposed into zinc oxide.

The composition of Sample 15 was as follows: 9 atomic % element yttrium, 16 atomic % element manganese, 52 atomic % element oxygen, and 23 atomic % element carbon. Element nitrogen was not detected. It was thus confirmed that yttrium nitrate that had been contained in the electrode active material layer-forming coating film was thermally decomposed into yttrium oxide.

The composition of Sample 16 was as follows: 5 atomic % element zirconium, 19 atomic % element manganese, 52 atomic % element oxygen, and 24 atomic % element carbon. Element chlorine was not detected. It was thus confirmed that zirconium chloride that had been contained in the electrode active material layer-forming coating film was thermally decomposed into zirconium oxide.

The composition of Sample 17 was as follows: 13 atomic % element iron, 9 atomic % element manganese, 57 atomic % element oxygen, and 21 atomic % element carbon. Element nitrogen was not detected. The result shows that iron nitrate that had been contained in the electrode active material layer-forming coating film was thermally decomposed into iron oxide.

The composition of Sample 18 was as follows: 14 atomic % element iron, 10 atomic % element manganese, 56 atomic % element oxygen, and 20 atomic % element carbon. Element nitrogen was not detected. The result shows that iron nitrate that had been contained in the electrode active material layer-forming coating film was thermally decomposed into iron oxide.

The composition of Sample 19 was as follows: 12 atomic % element iron, 9 atomic % element manganese, 57 atomic % element oxygen, and 22 atomic % element carbon. Element nitrogen was not detected. The result shows that iron nitrate that had been contained in the electrode active material layer-forming coating film was thermally decomposed into iron oxide.

The composition of Sample 20 was as follows: 13 atomic % element iron, 10 atomic % element manganese, 56 atomic % element oxygen, and 21 atomic % element carbon. Element nitrogen was not detected. The result shows that iron nitrate that had been contained in the electrode active material layer-forming coating film was thermally decomposed into iron oxide.

Further, taking the amount of the conductive material detected in Confirmation Test 1 into account, it was concluded that both carbonic matter originating from the acetylene black and the carbon fiber and carbonic matter distinct from the carbonic matter originating from the acetylene black and the carbon fiber were present in all the electrode active material layers in Examples 2 to 11, 13 to 17, 19 and 20 as well. Further, it was not confirmed from the composition analysis that carbonic matter was present in Examples 7, 12, and 18, and thus it is supposed that the amount of carbonic matter was extremely small.

Evaluation of Crystallinity of Samples 2 to 20:

Evaluation of the crystallinity of Samples 2 to 20 was made for Examples 2 to 20 respectively in the same manner as in the evaluation of the crystallinity of Sample 1 for Example 1. The result showed that the metal oxides present in these samples were amorphous like the metal oxide present in Sample 1 (the X-ray diffraction patterns of Samples 2 to 20 are not shown here).

Cyclic Voltammetry Test on Examples 2 to 20:

Examples 2 to 20 were subjected to the same cyclic voltammetry test as was carried out on Example 1, and cyclic voltammograms were obtained. On each cyclic voltammogram, a peak representing oxidation that is equivalent to lithium deintercalation reaction and a peak representing reduction that is equivalent to lithium intercalation reaction were observed (the cyclic voltammograms are not shown here). On the other hand, in Examples 2 to 20, laminates were obtained with the use of starting solutions for forming the above metal oxides (solutions to which the cathode active materials are not added yet) in the same manner as in the CV test carried out in Example 1, and were subjected to the CV test. The results of the test showed that no electrochemical reaction took place in all the films formed on the substrates. It was thus confirmed that the binding materials of Examples 2 to 20 do not cause lithium intercalation and deintercalation reactions.

Charge and Discharge Tests on Test Cells 2 to 20:

Using Examples 2 to 20, Test Cells 2 to 20 were assembled in the same manner as in the assemblage of Test Cell 1, respectively. The size of the plate in the shape of a disk obtained in each Example is the same as in Example 1, and the weight of the cathode active material in each disk is shown in Table 3 or 4.

Test Cells 2 to 20 were subjected to the same charge and discharge tests as in Example 1, except that the constant current in Example 1 was changed to the values shown in Tables 3 or 4. In all the charge and discharge tests carried out on the test cells of Examples and of Comparative Examples, the constant current values (discharge rate: 1 C) on discharge were the same as the constant current values (discharge rate: 1 C) on charge, so that the constant current values on charge are not shown in the table. The discharge capacity values (mAh) of each working electrode at the respective discharge rates were obtained. From these values, a discharge rate per weight (mAh/g) was obtained, and a percentage of discharge capacity retention was calculated. The discharge rates per weight (mAh/g) and percentages of discharge capacity retention of Test Cells 2 to 12 are shown in Table 3, and those of Test Cells 13 to 20 are shown in Table 4.

Comparative Example 1

Without using a metallic-element-containing compound or an organometallic compound, an electrode active material layer-forming composition in the form of a slurry with a solid matter content of 55% by weight was prepared in the following manner. NMP (manufactured by Mitsubishi Chemical Corp., Japan) as the solvent was added to 10 g of $LiMn_2O_4$ with a mean particle diameter of 4 μm as the cathode active material, 1.5 g of acetylene black ("Denka Black" manufactured by Denki Kagaku Kogyo K.K., Japan), 0.1 g of carbon fiber ("VGCF" manufactured by Showa Denko K.K., Japan), and PVDF ("KF #1100" manufactured by KUREHA CORPORATION, Japan) as the resin binder; and the mixture was kneaded with a homogenizer ("Excel Autohomogenizer" manufactured by NIHON SEIKI KAISHA, Japan) at 7000 rpm for 15 minutes.

And then, application of the electrode active material layer-forming composition to aluminum foil with a thickness of 15 μm as the cathode current collector, in such an amount that the dry weight of the composition would be 30 g/m² was made. It was however not easy to control the viscosity of the electrode active material layer-forming composition, and the fluidity of the composition remained low. For this reason, the application of the composition could not be done as desired, failing to form a cathode active material layer. It was thus impossible to produce an electrode plate for a non-aqueous electrolyte secondary battery.

Comparative Example 2

A cathode plate for a non-aqueous electrolyte secondary battery was produced in the same manner as in Example 1, except that no metallic-element-containing compound was used.

When cutting the cathode plate into a disk in the predetermined size in the same manner as in Example 1, the electrode active material layer peeled off the current collector, so that it was impossible to obtain a disk-shaped electrode plate that can be used in a three-electrode coin cell. In other words, the electrode active material layer in the cathode plate for a non-aqueous electrolyte secondary battery was poor in film-forming properties.

Comparative Example 3

A slurried composition for forming an electrode active material layer was prepared in the same manner as in Comparative Example 1, except that $LiMn_2O_4$ with a mean particle diameter of 10 μm was used as the cathode active material.

The electrode active material layer-forming composition was applied to aluminum foil with a thickness of 15 μm as the cathode current collector, in such an amount that the dry weight of the electrode active material layer-forming composition would be 30 g/m², and was dried with an oven, in an atmosphere of air at a temperature of 120° C. for 20 minutes, thereby forming, on the current collector, an electrode active material layer for the cathode. The electrode active material layer was pressed with a roller press to a coating density of 2.0 g/cm³ (thickness of the cathode active material layer: 30 μm). This one was cut into a piece in a predetermined size (in the shape of a disk with a diameter of 15 mm) and was vacuum-dried at 120° C. for 12 hours. In this manner, a cathode plate for a non-aqueous electrolyte secondary battery (a cathode plate of Comparative Example 3) was obtained. The electrode active material layer in this cathode plate was good in film-forming properties, and its thickness was 30 μm.

With the use of the cathode plate of Comparative Example 3, a three-electrode coin cell was assembled in the same manner as in Example 1. In order to determine the discharge capacity and the discharge rate of the cathode plate, the three-electrode coin cell was subjected to the same charge and discharge tests as in Example 1, except that the constant current value used in Example 1 was changed. The constant current values used in the charge and discharge tests and the results of the tests are shown in Table 4.

Comparative Example 4

A composition for forming an electrode active material layer was prepared in the same manner as in Comparative Example 1, except that $LiMn_2O_4$ with a mean particle diameter of 1 μm was used as the cathode active material. It was however not easy to control the viscosity of the electrode active material layer-forming composition, and the composition remained poor in fluidity. Although application of the electrode active material layer-forming composition to the same aluminum foil as was used in Comparative Example 1 in such an amount that the dry weight of the composition would be 30 g/m² was tried, it could not be done as desired, failing to form a cathode active material layer. It was thus impossible to produce a cathode plate for a non-aqueous electrolyte secondary battery.

Example 21

A starting solution for forming a metal oxide that does not cause lithium ion intercalation and deintercalation reactions was prepared by adding 5.0 g of titanium diisopropoxy bis(acetylacetonate) ("TC-100" available from Matsumoto Trading Co., Ltd., Japan) as the metallic-element-containing compound serving as the binding-material-forming material, to a solution of 1 g of polyethylene oxide as the organic material in 9 g of methanol. Subsequently, to the starting solution was added 7 g of graphite with a mean particle diameter of 4 μm as the particulate anode active material, and the mixture was kneaded with a homogenizer ("Excel Auto-homogenizer" manufactured by NIHON SEIKI KAISHA, Japan) at 7000 rpm for 20 minutes, whereby an electrode active material layer-forming composition was prepared.

Copper foil with a thickness of 10 μm was prepared as a current collector. The electrode active material layer-forming composition was applied to one surface of the current collector with an applicator in such an amount that the weight of the electrode active material layer to be finally formed would be 15 g/m², thereby forming an electrode active material layer-forming coating film.

Next, the current collector having on its surface the electrode active material layer-forming coating film was placed in an electric furnace (high-temperature-atmosphere box furnace, "KB8610N-VP" manufactured by Koyo Thermosystem K.K., Japan) with an atmosphere of an inert gas (nitrogen 99.99%), and was heated to 400° C. over a period of 1 hour. Heating was continued for a further 10 minutes while maintaining the temperature. In this manner, there was obtained an anode plate for a non-aqueous electrolyte secondary battery of the aforementioned embodiment, having on the current collector an electrode active material layer that contains the metal oxide and the particulate anode active material and that is suitable for use as an anode active material layer. After leaving the anode plate as it is until it cooled to room temperature, the electric furnace was opened to the air. The anode plate was taken out of the furnace and was cut into a piece in a predetermined size (in the shape of a disk with a diameter of 15 mm), whereby an anode plate of Example 21 was obtained.

EXAMPLES 22 to 24

Example 22

An anode plate of Example 22 was obtained in the same manner as in Example 21, except that the electrode active material layer-forming composition was applied to the current collector in the amount shown in Table 6.

Example 23

An anode plate of Example 23 was obtained in the same manner as in Example 21, except that graphite with a particle diameter of 10 μm was used as the particulate anode active material.

Example 24

An anode plate of Example 24 was obtained in the same manner as in Example 21, except that graphite with a particle diameter of 1 μm was used as the particulate anode active material, and that the electrode active material layer-forming composition was applied to the current collector in the amount shown in Table 6.

Thickness of Electrode Active Material Layer:

The thicknesses of the electrode active material layers in the anode plates of Examples 21 to 24 were measured in the same manner as in Example 1. The mean thickness values were obtained by calculation. They are shown in Table 6.

Evaluation of Film-Forming Properties:

The film-forming properties of the electrode active material layers in the anode plates of Examples 21 to 24 were evaluated in the same manner as in Example 1. The results are shown in Table 6.

Composition Analysis:

In the same manner as in the preparation of Sample 1, Samples 21 to 24 were obtained from the electrode active material layers formed in Examples 21 to 24, respectively. These samples were subjected to composition analyses. The following are the results of the analyses.

The composition of Sample 21 was as follows: 12 atomic % element titanium, 61 atomic % element carbon, and 27 atomic % element oxygen.

The composition of Sample 22 was as follows: 12 atomic % element titanium, 61 atomic % element carbon, and 27 atomic % element oxygen.

The composition of Sample 23 was as follows: 13 atomic % element titanium, 57 atomic % element carbon, and 30 atomic % element oxygen.

The composition of Sample 24 was as follows: 14 atomic % element titanium, 55 atomic % element carbon, and 31 atomic % element oxygen.

The above results show that titanium diisopropoxy bis (acetylacetonate) that had been contained in the electrode active material layer-forming coating films formed in Examples 21 to 24 were thermally decomposed into titanium oxide, and that the titanium oxide was present in the electrode active material layers.

Evaluation of Crystallinity of Samples 21 to 24:

Evaluation of the crystallinity of Samples 21 to 24 was made in the same manner as in the evaluation of the crystallinity of Sample 1. The results showed that the metal oxide (titanium oxide) present in the electrode active material layers of Samples 21 to 24 were amorphous like the metal oxide present in Sample 1 (the X-ray diffraction patterns of Samples 21 to 24 are not shown here).

Cyclic Voltammetry Test on Examples 21 to 24:

The anode plates of Examples 21 to 24 were subjected to the CV test, in order to confirm beforehand whether or not the metal oxide (i.e., titanium oxide) making up the electrode active material layers in Examples 21 to 24 cause lithium ion intercalation and deintercalation reactions. Specifically, the operation of sweeping the electrode potential from 3 V to 0.03V and then returning it to 3 V was repeated three times. The scanning rate was made 1 mV/sec. On the cyclic voltammogram showing the result of the second cycle, peaks representing oxidation and reduction were clearly observed. On the other hand, a laminate obtained by applying a starting solution for forming the above metal oxide (a solution to which the anode active material is not added yet) to an aluminum substrate with a Meyer bar No. 4, and heating the applied solution under the same conditions as in the production of the electrode plate, was subjected to the same CV test as is described above. On all the cyclic voltammograms showing the results of the first to third cycles, no peaks (electrochemical reactions) were observed. It was thus confirmed that titanium oxide present in Examples 21 to 24 as a binding material do not cause lithium ion intercalation and deintercalation reactions. The above CV test was carried out with a VMP3 manufactured by Bio Logic Corp.

Charge and Discharge Tests on Test Cells 21 to 24:

A non-aqueous electrolyte was first prepared in the same manner as in the assemblage of Test Cell 1. In place of using Example 1 as the cathode plate, the anode plates of Examples 21, 22, 23 and 24 was used as the working electrode. Test Cells 21 to 24 were assembled in the same manner as described in the assemblage of Test Cell 1, respectively. These test cells were subjected to the following charge and discharge tests. The following is a description of the charge and discharge tests carried out on Test Cell 21. Test Cells 22 to 24 too were subjected to the same charge and discharge tests, except that the constant current was changed to the current values shown in Table 7.

(Charge Test)

Test Cell 21 was charged at a constant current (707 μA) in an environment at 25° C. until the voltage reached 0.03 V. After the voltage had reached 0.03 V, the current (discharge rate: 1 C) was reduced to below 5% with the voltage retained above 0.03V, and constant-voltage charge was conducted until the test cell was fully charged. After this, the test cell was rested for 10 minutes. The above "1 C" is the current value at which the three-electrode coin cell discharges completely (the final discharge voltage is attained) in one hour when it is discharged at a constant current. The above constant current was set so that 372 mAh/g, the theoretical discharge capacity of graphite that is the active material on the working electrode of Test Cell 21, would be discharged in 1 hour.

(Discharge Test)

Test Cell 21 that had been fully charged was discharged at a constant current (707 μA) (discharge rate: 1 C) in an environment at 25° C. until the voltage increased from 0.03 V (full charge voltage) to 2.0V (final discharge voltage). Plotting cell voltage (V) as the ordinate and discharge time (h) as the abscissa, a discharge curve was drawn. Using this curve, the discharge capacity value (mAh) of the working electrode (the anode plate of Example 21) was obtained; it was converted into the value of the discharge capacity per unit weight of the working electrode (mAh/g).

Subsequently, on the basis of the constant-current discharge test carried out in the above-described manner at a constant current of 707 μA (discharge rate: 1 C, discharge completion time: 1 hour), constant-current discharge tests were carried out also at discharge rates of 50 C and 100 C. The discharge capacity values (mAh) of the working electrode at the respective discharge rates were obtained; they were converted into the values of discharge capacity per unit weight (mAh/g). The values of discharge capacity per unit weight (mAh/g) and the percentages of discharge capacity retention that were obtained from the above discharge tests on Test Cells 21 to 24 are collectively shown in Table 7.

(Calculation of Percentages of Discharge Capacity Retention)

The percentages of discharge capacity retention of Test Cells 21 to 24 were obtained in the manner described in Example 1. The results are shown in Table 7. In the column "evaluation of output characteristics" in Table 7 are shown the discharge rate characteristics of the electrodes rated in accordance with the following criteria.

The percentage of discharge capacity retention at a discharge rate of 50 C is 80% or more and 100% or less: ◎

The percentage of discharge capacity retention at a discharge rate of 50 C is 50% or more and less than 80%: ◯

The percentage of discharge capacity retention at a discharge rate of 50 C is less than 50%: X Confirmation of the Presence of Carbonic Matter Distinct from Conductive Materials:

The presence of carbonic matter distinct from conductive materials, in the electrode active material layer in Example 21, was confirmed by the above-described STEM in the following manner. Example 21 was first cut nearly perpendicularly to the current collector plane. The carbonic matter present on this section taken along the thickness of the electrode active material layer was colored by means of element carbon mapping, and the section was observed by STEM. It was observed that particles with particle diameters of around 15 nm, containing carbonic matter, were sporadically present on the section of the electrode active material layer. These colored portions showing carbonic matter are much smaller than colored portions showing the particles of known conductive materials. It was thus confirmed that carbonic matter distinct from conductive materials was present in the electrode active material layer in Example 21. The anode plates of Examples 22 to 24 and those of the following Comparative Examples 6 to 9 and Referential Example 1 too were subjected to the same test for confirming the presence of carbonic matter distinct from conductive materials as the above. It was confirmed that the carbonic matter was present in the electrode active material layers in the anode plates of Examples 22 to 24 as in the anode plate of Example 21, The results are shown in Table 6.

Evaluation of Working Properties of Examples 21 to 24 (Bend Test):

The evaluation of the working properties of Example 21 was made by the bend test method using a cylindrical mandrel, specified in JIS K 5600-5-1. Into the test plate fitted with an appropriate mandrel, Example 21 was inserted in such a direction that it may subsequently be bent with the electrode active material layer side outward. The test plate was fixed to the testing machine at its both ends, and was bent evenly at a constant rate over a period of two seconds, thus bending the anode plate over the mandrel through 180 degrees. The anode plate was removed from the test plate, and the surface of the electrode active material layer was visually observed and evaluated in accordance with the following criteria.

The electrode active material layer did not crack or peel off the current collector: ◉

Although the electrode active material layer slightly cracked or peeled off the current collector, the anode plate was still fit for use: ◯

The electrode active material layer cracked or peeled off the current collector; the anode plate was unfit for use: X For the above evaluation of working properties was used a machine for bend test using a mandrel ("Model REF802" manufactured by SEPRO Co.). The working properties of Examples 22 to 24 were evaluated in the above-described manner as well. The results are shown in Table 6.

Evaluation of Coating Properties of Examples 21 to 24:

The coating properties of the electrode active material layer-forming compositions applied to the current collectors in Examples 21 to 24 were evaluated by visually observing, after the application step, the coating films formed on the current collectors and rating them in accordance with the following criteria.

The surface of the coating film was uniform: ◉

Some irregularities were observed on part of the surface of the coating film: ◯

Lines or unevenness in coating were observed on the surface of the coating film: Δ

Such lines or unevenness in coating as to make the anode plate unfit for use were clearly observed on the surface of the coating film: X The results are shown in Table 6.

Comparative Example 5

Without using any binding-material-forming material, an electrode active material layer-forming composition in the form of a slurry, having a solid matter content of 55% by weight, was prepared in the following manner. NMP (manufactured by Mitsubishi Chemical Corp., Japan) as the solvent was added to 10 g of graphite with a mean particle diameter of 12 μm as the anode active material and 1.3 g of PVDF ("KF #1100" manufactured by KUREHA CORPORATION, Japan) as the resin binder, and the mixture was kneaded with a homogenizer ("Excel Autohomogenizer" manufactured by NIHON SEIKI KAISHA, Japan) at 7000 rpm for 15 minutes.

The electrode active material layer-forming composition was applied to copper foil with a thickness of 10 μm as the anode current collector in such an amount that the dry weight of the electrode active material layer-forming composition would be 65 g/m$^2$, and was then dried with an oven, in an atmosphere of air at 70° C., thereby forming on the current collector an electrode active material layer for an anode plate.

Subsequently, the electrode active material layer formed on the current collector was pressed with a roller press until its thickness reached about 85 μm. The current collector with the pressed electrode active material layer was cut into a piece in a predetermined size (in the shape of a disk with a diameter of 15 mm), and was vacuum-dried at 70° C. for 300 minutes. In this manner, an anode plate of Comparative Example 5 was obtained.

Comparative Examples 6 to 9

Anode plates of Comparative Examples 6 to 9 were obtained in the same manner as in the production of the anode plate of Comparative Example 5, except that the graphite with a mean particle diameter of 12 μm, particulate anode active material, was changed to graphite with the particle diameters shown in Table 5, that the amount of the electrode active material layer-forming composition applied to the current collector was changed to the ones shown in Table 6, and that the thickness of the electrode active material layer was changed to the ones shown in Table 6.

In order to carry out charge and discharge tests on the anode plates of Comparative Examples 5 to 9 in the same manner as in Example 21, assemblage of Comparative Test Cells 5 to 9 was made in the same manner as in the assemblage of Test Cell 21. Since the electrode active material layers in the anode plates of Comparative Examples 6 to 9 were poor in the film-forming properties, Comparative Test Cells 6 to 9 (three-electrode coin cells) could not be assembled with the use of these anode plates, and thus it was impossible to carry out the charge and discharge tests. Comparative Test Cell 5 assembled successfully was subjected to the same charge and discharge tests as in Example 21, except that the constant current was changed to the one shown in Table 7. All the results obtained from the above are shown in Table 7.

Examples 5 to 9 were subjected to the evaluation of film-forming properties, working properties, and coating properties. The results are shown in Table 6. As for Comparative Examples 7 to 9, since the coating properties of the electrode active material layer-forming compositions were poor, it was impossible to evaluate the working properties of the electrode active material layers properly.

Referential Example 1

An anode plate of Referential Example 1 that is the same as the cathode plate of Example 21 except that the electrode active material layer contains no carbonic matter, was obtained in the same manner as in Example 21, except that the heating conditions used in the heating step in Example 21 were changed to the following. The current collector having thereon the coating film, placed in the electric oven, was heated to a temperature of 400° C. in an atmosphere of an inert gas (nitrogen) over a period of 1 hour. Heating was continued for a further 10 minutes while maintaining the temperature at 400° C. The electric oven was left as it is until it cooled to room temperature, and was then opened to the air. The current collector with the coating film was taken out of the electric oven. The atmosphere in the electric oven was changed to a hydrogen reduction atmosphere (hydrogen content 4%, nitrogen content 96%), and the current collector was heated in it to 400° C. over a period of 1 hour. Heating was continued for a further 10 minutes while maintaining the temperature at 400° C. After leaving the oven as it is until it cooled to room temperature, it was opened to the air, and the current collector was taken out of it.

Referential Example 1 was evaluated in the same manner as in the evaluation of Example 21. The evaluation items were as follows: the thickness of the electrode active material layer, the film-forming properties, the crystallinity of the binding material, the presence or absence of carbonic matter, CV test, working properties, and coating properties. The results of the evaluation showed that Referential Example 1 had working properties that are good enough to fulfill the requirement for electrodes, but are slightly inferior to those of Examples 21 to 24.

The above results of the charge and discharge tests on the cathode plates of Examples 1 to 20 and of Comparative Examples 1 to 4 show the following. The percentages of discharge capacity retention of the cathode plates of Examples 1 to 20 and that of Comparative Example 3 at a discharge rate of 1 C are about 100%. As the discharge rate increases, the percentage of discharge capacity retention of the cathode plate of Comparative Example 3 decreases significantly, although those of all the cathode plates of Examples 1 to 20 remain high.

In Comparative Example 2, the production of a cathode plate was tried in the same manner as in the production of the cathode plate of Example 1, except that no metal oxide was formed in the electrode active material layer. The electrode active material layer, however, was poor in film-forming properties and peeled off the current collector, so that it was impossible to produce a cathode plate. This shows that the metal oxide present in the electrode active material layer formed in Example 1 surely acts as a binding material.

Further, in Comparative Examples 1 to 4, the production of cathode plates using conventional resin binders was tried. However, since the particle diameters of the particulate cathode active materials used in the electrode active material layer-forming compositions were as small as 5 μm or less, it was difficult to control the viscosity of the electrode active material layer-forming compositions. It was thus impossible to produce cathode plates. On the other hand, the results of the evaluation of the cathode plates of Examples 1 to 20 show the following. In the aforementioned embodiment, even when a particulate cathode active material with a small particle diameter of 5 μm or less is used, it is possible to produce a cathode plate successfully, and the percentage of discharge capacity retention of the cathode plate is extremely high.

Furthermore, the above results of the tests on the anode plates of Examples 21 to 24 and of Comparative Examples 5 to 9 show that all Examples 21 to 24 are extremely good in output and input characteristics. Although metal oxides were made to exist as binding materials in place of resin binders in the production of Examples 21 to 24, it was confirmed that Examples 21 to 24 had good film-forming properties and working properties comparable to those of conventional anode plates. In the production of Examples 21 to 24, the electrode active material layer-forming compositions showed good coating properties irrespective of the particle diameters of the particulate active materials used in the compositions. On the other hand, in the production of Comparative Examples 5 and 6 in which a particulate anode active material with a particle diameter of 12 μm was used, the electrode active material layer-forming compositions showed moderate coating properties, but in the production of Comparative Examples 7 to 9 in which particulate anode active materials with particle diameters of 10 μm or less were used, the electrode active material layer-forming compositions were poor in coating properties. It is thus confirmed that in the above embodiment, even a particulate anode active material with a small particle diameter, of which use has been difficult in the prior art, can be used without difficulty. Moreover, it was confirmed that Referential Example 1, which is the same as Example 21, except that no carbonic matter was present in the electrode active material layer, had working properties slightly inferior to those of Examples of 21 to 24, though it was still fit for use.

As mentioned above, the anode plates of Examples 21 to 24 show extremely excellent output and input characteristics as compared with the anode plates of Comparative Examples 5 to 9. It is thus understood that when an anode plate made of an electrode plate explained in the above description of this embodiment is used for a non-aqueous electrolyte secondary battery, the battery shows desirably improved output and input characteristics.

The electrode plates for non-aqueous electrolyte secondary batteries according to the above embodiment showed extremely high percentages of discharge capacity retention either when used as the cathode plate or when used as the anode plate, as described above. It was thus confirmed that the electrode plates according to the above embodiment have extremely high discharge rate characteristics. From this was deduced that the electrode plates according to the above-described embodiment are excellent in charge rate characteristics as well. That is to say, it was confirmed by the results of the above charge and discharge tests that the electrode plates according to the above embodiment are excellent in output and input characteristics. Furthermore, evaluation of working properties was made on the anode plates of Examples as the evaluation of electrode plates according to the above embodiment. The results of the evaluation showed that the anode plates were excellent in working properties and cyclic characteristics; this is not limited to the anode plates made of electrode plates of the above embodiment, and cathode plates made of electrode plates of the above embodiment are excellent in these properties and characteristics as well. The use of an electrode plate of the above embodiment as the cathode plate and/or the anode plate, therefore, makes it possible to provide a non-aqueous electrolyte secondary battery more excellent in discharge rate characteristics than ever.

The above Examples were performed according to the production method explained in the above description of the embodiment. The above-described method for producing an electrode plate for a non-aqueous electrolyte secondary battery does not require the pressing step, unlike a conventional production method, and is composed of very simple steps. Moreover, since no resin binder is used unlike in the prior art, and instead, a precursor to a binding material is incorporated in an electrode active material layer-forming composition, it is possible to obtain an electrode active material layer-forming composition with a desirable viscosity value irrespective of the particle diameter of the particulate electrode active material used in the composition, and thus to apply the electrode active material layer-forming composition to a current collector very easily. Furthermore, it was shown that when the production method explained in the above description of the embodiment is employed, it is possible to produce not only an electrode plate having an electrode active material layer with a conventional thickness but also an electrode plate having an electrode active material layer with an extremely small thickness. It was also shown that electrode plates obtained by the production method explained in the above description of the embodiment have extremely desirable discharge rate characteristics, as mentioned above.

TABLE 1

|  |  | Particle diameter of cathode active material ($LiMn_2O_4$) | Metal-containing compound or organometallic compound | | Solvent | | Additional organic material | |
|---|---|---|---|---|---|---|---|---|
|  |  |  | Type | amount | type | Amount | type | Amount |
| Example | 1 | 4 μm | $Fe(NO_3)_3 \cdot 9H_2O$ | 10 g | Ethanol | 20 g | Polyethylene glycol | 10 g |
|  | 2 | 4 μm | $Fe(NO_3)_3 \cdot 9H_2O$ | 0.4 g | Methanol | 5 g | Polyethylene glycol | 10 g |
|  | 3 | 0.3 μm | $Fe(NO_3)_3 \cdot 9H_2O$ | 10 g | Ethanol | 20 g | Polyethylene glycol | 10 g |
|  | 4 | 10 μm | $Fe(NO_3)_3 \cdot 9H_2O$ | 10 g | Ethanol | 20 g | Polyethylene glycol | 10 g |
|  | 5 | 1 μm | $Fe(NO_3)_3 \cdot 9H_2O$/TC100 | 2 g/23 g | Ethanol | 35 g | Ethyl cellulose | 5 g |
|  | 6 | 1 μm | $Li(CH_3COO) \cdot 2H_2O$ | 4 g | Methanol | 16 g | Ethyl cellulose | 10 g |
|  | 7 | 1 μm | $Ni(CH_3COCHCOCH_3)_2 \cdot 2H_2O$ | 12 g | Ethanol | 16 g | — | — |
|  | 8 | 1 μm | $Mg(NO_3)_2 \cdot 6H_2O$ | 4 g | Water/Methanol | 13 g/3 g | Starch | 5 g |
|  | 9 | 1 μm | $Cu(NO_3)_2 \cdot 3H_2O$ | 6 g | Methanol/Acetone | 10 g/5 g | Cellulose acetate | 5 g |
|  | 10 | 1 μm | $Ca(NO_3)_2 \cdot 4H_2O$ | 7 g | Methanol | 15 g | Relasing varnish | 10 g |
|  | 11 | 1 μm | $Cr(NO_3)_3 \cdot 9H_2O$/TC100 | 5 g/5 g | Methanol | 15 g | Heat-sensitive adhesive | 7 g |
|  | 12 | 1 μm | $(CH_3COCH:C(CH_3)O)_2CO$ | 9 g | Methanol/Toluene | 15 g/10 g | Phenol resin | 10 g |
|  | 13 | 1 μm | $Mn(NO_3)_2 \cdot 6H_2O$ | 9 g | Methanol/Xylene | 10 g/10 g | Acryl-modified resin | 8 g |
|  | 14 | 1 μm | $Zn(NO_3)_2 \cdot 6H_2O$ | 7 g | Methanol | 20 g | Epoxy resin | 5g |
|  | 15 | 1 μm | $Y(CH_3COCHCOCH_3)_3 \cdot 2H_2O$ | 11 g | Methanol | 15 g | Polyethylene glycol | 10 g |
|  | 16 | 1 μm | $Zr(CH_3COCHCOCH_3)_4$ | 6 g | Methanol | 25 g | Polyethylene glycol | 10 g |
|  | 17 | 0.3 μm | $Fe(NO_3)_3 \cdot 9H_2O$ | 10 g | Ethanol | 20 g | Polyethylene glycol | 10 g |
|  | 18 | 1 μm | $Fe(NO_3)_3 \cdot 9H_2O$ | 10 g | Ethanol | 20 g | Polyethylene glycol | 10 g |
|  | 19 | 1 μm | $Fe(NO_3)_3 \cdot 9H_2O$ | 10 g | Ethanol | 20 g | Polyethylene glycol | 10 g |
|  | 20 | 1 μm | $Fe(NO_3)_3 \cdot 9H_2O$ | 10 g | Ethanol | 20 g | Polyethylene glycol | 10 g |
| Comparative Example | 1 | 4 μm | (*1) | — | NMP | — | — | — |
|  | 2 | 4 μm | — | — | Ethanol | 20 g | Polyethylene glycol | 10 g |
|  | 3 | 10 μm | (*1) | — | NMP | — | — | — |
|  | 4 | 1 μm | (*1) | — | NMP | — | — | — |

*1 PVDF (1.3 g) was used as the binding material.
** In all Examples and Comparative Examples, acetylene black (1.5 g) and carbon fiber (0.1 g) were used as in Example 1.
*** The cathode active material was used in an amount of 10 g.

TABLE 2

|  |  | Amount of electrode active material layer-forming composition (g/m$^2$) (*1) | Thickness of electrode active material layer (μm) | Film forming properties | Binding material (binder) | Crystallinity of binding material | Carbonic matter in electrode active material | CV test (*2) |
|---|---|---|---|---|---|---|---|---|
| Example | 1 | 15 | 24 μm | excellent | Iron oxide | crystalline | Present | none |
|  | 2 | 5 | 7 μm | excellent | Iron oxide | crystalline | Present | none |
|  | 3 | 19 | 26 μm | excellent | Iron oxide | crystalline | Present | none |
|  | 4 | 23 | 40 μm | excellent | Iron oxide | crystalline | Present | none |
|  | 5 | 30 | 37 μm | excellent | Iron-titanium double oxide | crystalline | Present | none |
|  | 6 | 5 | 12 μm | excellent | Lithium oxide | crystalline | Present | none |
|  | 7 | 4 | 8 μm | excellent | Nickel oxide | crystalline | Present | none |
|  | 8 | 2 | 10 μm | excellent | Magnesium oxide | crystalline | Present | none |
|  | 9 | 3 | 8 μm | excellent | Copper oxide | crystalline | Present | none |
|  | 10 | 3 | 12 μm | excellent | Calcium oxide | crystalline | Present | none |
|  | 11 | 5 | 12 μm | excellent | Chromium-titanium double oxide | crystalline | Present | none |
|  | 12 | 5 | 14 μm | excellent | Cobalt oxide | crystalline | Present | none |
|  | 13 | 5 | 14 μm | excellent | Manganese oxide | crystalline | Present | none |
|  | 14 | 3 | 10 μm | excellent | Znic oxide | crystalline | Present | none |

TABLE 2-continued

|  |  | Amount of electrode active material layer-forming composition (g/m²) (*1) | Thickness of electrode active material layer (μm) | Film forming properties | Binding material (binder) | Crystallinity of binding material | Carbonic matter in electrode active material | CV test (*2) |
|---|---|---|---|---|---|---|---|---|
|  | 15 | 12 | 18 μm | excellent | Yttrium oxide | crystalline | Present | none |
|  | 16 | 3 | 10 μm | excellent | Zirconium oxide | crystalline | Present | none |
|  | 17 | 1 | 500 nm | excellent | Iron oxide | crystalline | Present | none |
|  | 18 | 13 | 21 μm | excellent | Iron oxide | crystalline | Present | none |
|  | 19 | 7 | 12 μm | excellent | Iron oxide | crystalline | Present | none |
|  | 20 | 3 | 4 μm | excellent | Iron oxide | crystalline | Present | none |
| Comparative Example | 1 | 30 | n.t. | poor | Resin binder | n.t. | n.t. | n.t. |
|  | 2 | 20 | n.t. | poor | — | n.t. | n.t. | n.t. |
|  | 3 | 30 | 30 μm | excellent | Resin binder | — | — | — |
|  | 4 | 30 | n.t. | n.t. | Resin binder | n.t. | n.t. | n.t. |

*1 The weight per unit area of the finally obtained electrode active material layer.
*2 When the binding material does not cause lithium intercalation and deintercalation reactions, it is rated as "none".

TABLE 3

| Example | Weight per unit area of cathode active material (*1) (mg/1.77cm²) | Discharge rate | Constant current | Discharge capacity (mAhr/g) | Percentage of discharge capacity retention | Output characteristics rating |
|---|---|---|---|---|---|---|
| Example 1 | 2.31 | 1 c | 245 μA | 91 | — | ◎ |
|  |  | 50 c | 12.2 mA | 90 | 99% |  |
|  |  | 100 c | 24.5 mA | 87 | 96% |  |
| Example 2 | 0.77 | 1 c | 80 μA | 91 | — | ◎ |
|  |  | 50 c | 4.0 mA | 89 | 98% |  |
|  |  | 100 c | 8.0 mA | 88 | 97% |  |
| Example 3 | 2.88 | 1 c | 305 μA | 91 | — | ◎ |
|  |  | 50 c | 15.3 mA | 91 | 100% |  |
|  |  | 100 c | 30.5 mA | 90 | 99% |  |
| Example 4 | 3.49 | 1 c | 369 μA | 91 | — | ◎ |
|  |  | 50 c | 18.5 mA | 87 | 96% |  |
|  |  | 100 c | 36.9 mA | 75 | 82% |  |
| Example 5 | 4.5 | 1 c | 476 μA | 91 | — | ◎ |
|  |  | 50 c | 23.8 mA | 83 | 91% |  |
|  |  | 100 c | 47.6 mA | 69 | 76% |  |
| Example 6 | 0.72 | 1 c | 110 μA | 91 | — | ○ |
|  |  | 50 c | 5.5 mA | 49 | 54% |  |
|  |  | 100 c | 11.1 mA | 33 | 36% |  |
| Example 7 | 0.6 | 1 c | 91 μA | 91 | — | ○ |
|  |  | 50 c | 4.6 mA | 54 | 59% |  |
|  |  | 100 c | 9.1 mA | 30 | 33% |  |
| Example 8 | 0.3 | 1 c | 46 μA | 91 | — | ◎ |
|  |  | 50 c | 2.3 mA | 60 | 66% |  |
|  |  | 100 c | 4.6 mA | 26 | 29% |  |
| Example 9 | 0.47 | 1 c | 61 μA | 91 | — | ◎ |
|  |  | 50 c | 3.1 mA | 67 | 74% |  |
|  |  | 100 c | 6.1 mA | 33 | 36% |  |
| Example 10 | 0.46 | 1 c | 59 μA | 91 | — | ◎ |
|  |  | 50 c | 3.0 mA | 80 | 88% |  |
|  |  | 100 c | 6.0 mA | 66 | 73% |  |
| Example 11 | 0.76 | 1 c | 99 μA | 91 | — | ◎ |
|  |  | 50 c | 4.9 mA | 77 | 85% |  |
|  |  | 100 c | 9.9 mA | 65 | 71% |  |
| Example 12 | 0.71 | 1 c | 92 μA | 90 | — | ◎ |
|  |  | 50 c | 4.6 mA | 68 | 76% |  |
|  |  | 100 c | 9.2 mA | 37 | 41% |  |

*1 The weight of the cathode active material (mg/1.77 cm²) in the disk with a diameter of 15 mm cut out of Example.

TABLE 4

| | Weight per unit area of anode active material (*1) (mg/1.77cm²) | Discharge rate | Constant current | Discharge capacity (mAhr/g) | Percentage of discharge capacity retention | Output characteristics rating |
|---|---|---|---|---|---|---|
| Example 13 | 0.78 | 1 c | 101 μA | 91 | — | ⊚ |
| | | 50 c | 5.5 mA | 65 | 71% | |
| | | 100 c | 10.1 mA | 20 | 22% | |
| Example 14 | 0.48 | 1 c | 62 μA | 91 | — | ⊚ |
| | | 50 c | 3.1 mA | 59 | 65% | |
| | | 100 c | 6.2 mA | 28 | 28% | |
| Example 15 | 1.87 | 1 c | 243 μA | 91 | — | ⊚ |
| | | 50 c | 12.2 mA | 82 | 90% | |
| | | 100 c | 24.3 mA | 71 | 78% | |
| Example 16 | 0.47 | 1 c | 61 μA | 90 | — | ⊚ |
| | | 50 c | 3.1 mA | 62 | 69% | |
| | | 100 c | 6.1 mA | 22 | 24% | |
| Example 17 | 0.17 | 1 c | 22 μA | 91 | — | ⊚ |
| | | 50 c | 1.1 mA | 91 | 100% | |
| | | 100 c | 2.2 mA | 91 | 100% | |
| Example 18 | 1.97 | 1 C | 256 μA | 90 | — | ⊚ |
| | | 50 C | 12.8 mA | 90 | 100% | |
| | | 100 C | 25.6 mA | 82 | 91% | |
| Example 19 | 1.11 | 1 C | 144 μA | 91 | — | ⊚ |
| | | 50 C | 7.2 mA | 91 | 100% | |
| | | 100 C | 14.4 mA | 89 | 98% | |
| Example 20 | 0.47 | 1 C | 61 μA | 91 | — | ⊚ |
| | | 50 C | 3.1 mA | 91 | 100% | ⊚ |
| | | 100 C | 6.1 mA | 91 | 100% | ⊚ |
| Comparative Example 1 | — | 1 c | n.t | n.t | n.t | x |
| | | 50 c | n.t | n.t | n.t | |
| | | 100 c | n.t | n.t | n.t | |
| Comparative Example 2 | — | 1 c | n.t | n.t | n.t | x |
| | | 50 c | n.t | n.t | n.t | |
| | | 100 c | n.t | n.t | n.t | |
| Comparative Example 3 | 5.5 | 1 c | 351 μA | 91 | — | Δ |
| | | 50 c | 17.55 mA | 28 | 31% | |
| | | 100 c | 35.10 mA | 13 | 14% | |
| Comparative Example 4 | — | 1 c | n.t | n.t | n.t | x |
| | | 50 c | n.t | n.t | n.t | |
| | | 100 c | n.t | n.t | n.t | |

*1 The weight of the cathode active material (mg/1.77 cm²) in the disk with a diameter of 15 mm cut out of Example or Comparative Example.

TABLE 5

| | | Particle diameter of anode active material (graphite) | Binding-material-forming material | | solvent | | Additional organic material | |
|---|---|---|---|---|---|---|---|---|
| | | | Type | amount | Type | amount | Type | amount |
| Example | 21 | 4 μm | Titanium diisopropoxybis(acetylacetonate) | 5 g | methanol | 9 g | Polyethylane oxide | 1 g |
| | 22 | 4 μm | Titanium diisopropoxybis(acetylacetonate) | 5 g | methanol | 9 g | Polyethylane oxide | 1 g |
| | 23 | 10 μm | Titanium diisopropoxybis(acetylacetonate) | 5 g | methanol | 9 g | Polyethylane oxide | 1 g |
| | 24 | 1 μm | Titanium diisopropoxybis(acetylacetonate) | 5 g | methanol | 9 g | Polyethylane oxide | 1 g |
| Comparative Example | 5 | 12 μm | -(PVDF resin) | (1.3 g) | NMP | — | — | — |
| | 6 | 12 μm | -(PVDF resin) | (1.3 g) | NMP | — | — | — |
| | 7 | 10 μm | -(PVDF resin) | (1.3 g) | NMP | — | — | — |
| | 8 | 4 μm | -(PVDF resin) | (1.3 g) | NMP | — | — | — |
| | 9 | 1 μm | -(PVDF resin) | (1.3 g) | NMP | — | — | — |
| Referential Example | 1 | 4 μm | Titanium diisopropoxybis(acetylacetonate) | 5 g | methanol | 9 g | Polyethylane oxide | — |

TABLE 6

| | Amount of electrode active material layer-forming composition (g/m²)(*1) | Thickness of electrode active material layer | Film-forming properties | Binding material (binder) | Crystallinity of binding material | Carbonic matter distinct from conductive materials in electrode active material | CV test (lithium ion intercalation and deintercalation) (*2) | Working properties | Coating properties |
|---|---|---|---|---|---|---|---|---|---|
| Example 21 | 15 | 28 μm | good | Titanium oxide | amorphous | present | none | ◎ | ◎ |
| Example 22 | 54 | 62 μm | good | Titanium oxide | amorphous | present | none | ◎ | ◎ |
| Example 23 | 15 | 29 μm | good | Titanium oxide | amorphous | present | none | ◎ | ◎ |
| Example 24 | 2 | 5 μm | good | Titanium oxide | amorphous | present | none | ◎ | ◎ |
| Comparative Example 5 | 65 | 85 μm | good | Resin binder | n.t. | n.t. | n.t. | ◎ | ○ |
| Comparative Example 6 | 15 | 30 μm | poor | Resin binder | n.t. | n.t. | n.t. | ◎ | ○ |
| Comparative Example 7 | 15 | 29 μm | poor | Resin binder | n.t. | n.t. | n.t. | n.t. | Δ |
| Comparative Example 8 | 15 | 30 μm | poor | Resin binder | n.t. | n.t. | n.t. | n.t. | x |
| Comparative Example 9 | 2 | 5 μm | poor | Resin binder | n.t. | n.t. | n.t. | n.t. | x |
| Referential Example 1 | 15 | 28 μm | good | Titanium oxide | amorphous | none | none | ○ | ◎ |

*1 The weight per unit area of the finally obtained electrode active material layer.
*2 When the binding material does not cause lithium intercalation and deintercalation reactions, it is rated as "none".

TABLE 7

| | Weight per unit area of anode active material (*2) (mg/1.77cm²) | Discharge rate | Constant current | Discharge capacity (mAhr/g) | Percentage of discharge capacity retention (%) | Output characteristics rating |
|---|---|---|---|---|---|---|
| Example 21 | 1.9 | 1 c | 707 μA | 367 | — | ◎ |
| | | 50 c | 35.3 mA | 352 | 96% | |
| | | 100 c | 70.7 mA | 338 | 92% | |
| Example 22 | 6.7 | 1 c | 2.48 μA | 365 | — | ○ |
| | | 50 c | 124 mA | 257 | 70% | |
| | | 100 c | 248 mA | 6 | 0% | |
| Example 23 | 1.9 | 1 c | 710 μA | 367 | — | ◎ |
| | | 50 c | 35.5 mA | 357 | 97% | |
| | | 100 c | 71.0 mA | 344 | 94% | |
| Example 24 | 0.5 | 1 c | 185 μA | 368 | — | ◎ |
| | | 50 c | 9.3 mA | 368 | 100% | |
| | | 100 c | 18.5 mA | 368 | 100% | |
| Comparative Example 5 | 10 | 1 c | 3.7 μA | 364 | — | x |
| | | 50 c | 185 mA | 4 | 0% | |
| | | 100 c | 370 mA | 0 | 0% | |
| Comparative Example 6 | Owing to poor film-forming properties, lines occurred, to which agglomerates seemed to contribute. | | | | | |
| Comparative Example 7 | Owing to poor film-forming properties, lines occurred, to which agglomerates seemed to contribute. | | | | | |
| Comparative Example 8 | Owing to poor film-forming properties, lines occurred, to which agglomerates seemed to contribute. | | | | | |
| Comparative Example 9 | Owing to poor film-forming properties, lines occurred, to which agglomerates seemed to contribute. | | | | | |

*2 The weight of the particulate active material (mg/1.77 cm²) in the disk with a diameter of 15 mm cut out of Example or Comparative Example.

The invention claimed is:

1. A method for producing an electrode plate for a non-aqueous electrolyte secondary battery, comprising the steps of:

applying an electrode active material layer-forming composition containing at least a particulate electrode active material, a metallic-element-containing compound for forming a metal oxide that serves as a binding material, an organic material capable of giving carbonic matter distinct from conductive materials, and a solvent, to at least a part of a current collector, thereby forming a coating film; and heating the coating film so as to evaporate the solvent and to decompose the metallic-element-containing compound thermally into a metal oxide, thereby forming, on the current collector, an electrode active material layer containing the metal oxide and the particulate electrode active material, wherein a metallic-element-containing compound that forms, in the heating step, a metal oxide that does not cause alkaline metal ion intercalation and deintercalation reactions is selected as the metallic-element-containing compound, wherein, in the heating step, the coating film is heated at a temperature that is equal to or more than the temperature at which the metallic-element-containing compound begins to decompose thermally, that is less than the crystallization temperature of the metal oxide that is formed in the heating step, and at which carbon originating from the organic material can remain in the electrode active material layer as carbonic matter distinct from conductive materials, and wherein the electrode active material layer-forming composition does not contain a resinous binder.

2. The method for producing an electrode plate for a non-aqueous electrolyte secondary battery according to claim 1, wherein the metallic-element-containing compound is a metal salt.

3. A method for producing an electrode plate for a non-aqueous electrolyte secondary battery, comprising the steps of:

applying an electrode active material layer-forming composition containing at least a particulate electrode active material, an organometallic compound for forming a metal oxide that serves as a binding material, and a solvent, to at least a part of a current collector, thereby forming a coating film; and heating the coating film so as to evaporate the solvent and to decompose the organometallic compound thermally into a metal oxide, thereby forming, on the current collector, an electrode active material layer containing the metal oxide and the particulate electrode active material, wherein an organometallic compound that forms, in the heating step, a metal oxide that does not cause alkaline metal ion intercalation and deintercalation reactions is selected as the organometallic compound, wherein, in the heating step, the coating film is heated at a temperature that is equal to or more than the temperature at which the organometallic compound begins to decompose thermally, that is less than the crystallization temperature of the metal oxide that is formed in the heating step, and at which carbon originating from the organometallic compound can remain in the electrode active material layer as carbonic matter distinct from conductive materials, and wherein the electrode active material layer-forming composition does not contain a resinous binder.

4. The method for producing an electrode plate for a non-aqueous electrolyte secondary battery according to claim 3, wherein the organometallic compound is a metal salt.

5. A method for producing an electrode plate for a non-aqueous electrolyte secondary battery, comprising the steps of:

applying an electrode active material layer-forming composition containing at least a particulate electrode active material, an organometallic compound for forming a metal oxide that serves as a binding material, an organic material capable of giving carbonic matter distinct from conductive materials, and a solvent, to at least a part of a current collector, thereby forming a coating film; and heating the coating film so as to evaporate the solvent and to decompose the organometallic compound thermally into a metal oxide, thereby forming, on the current collector, an electrode active material layer containing the metal oxide and the particulate electrode active material, wherein an organometallic compound that forms, in the heating step, a metal oxide that does not cause alkaline metal ion intercalation and deintercalation reactions is selected as the organometallic compound, wherein, in the heating step, the coating film is heated at a temperature that is equal to or more than the temperature at which the organometallic compound begins to decompose thermally, that is less than the crystallization temperature of the metal oxide that is formed in the heating step, and at which carbon originating from at least one of the organometallic compound and the organic material can remain in the electrode active material layer as carbonic matter distinct from conductive materials, and wherein the electrode active material layer-forming composition does not contain a resinous binder.

6. The method for producing an electrode plate for a non-aqueous electrolyte secondary battery according to claim 5, wherein the organometallic compound is a metal salt.

* * * * *